(12) United States Patent
Kaima

(10) Patent No.: US 9,241,089 B2
(45) Date of Patent: *Jan. 19, 2016

(54) IMAGE FORMING APPARATUS AND METHOD FOR SCALING IMAGE DATA BY A CORRECTION PIXEL

(71) Applicant: Ricoh Company, Ltd., Ohta-ku (JP)

(72) Inventor: Nobuyoshi Kaima, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 31 days.

This patent is subject to a terminal disclaimer.

(21) Appl. No.: 14/282,594

(22) Filed: May 20, 2014

(65) Prior Publication Data

US 2014/0253984 A1    Sep. 11, 2014

Related U.S. Application Data

(63) Continuation of application No. 13/043,666, filed on Mar. 9, 2011, now Pat. No. 8,767,250.

(30) Foreign Application Priority Data

Mar. 17, 2010 (JP) ................................. 2010-061672

(51) Int. Cl.
*H04N 1/393* (2006.01)
*G06K 15/12* (2006.01)
*G06K 15/02* (2006.01)
*H04N 1/113* (2006.01)

(52) U.S. Cl.
CPC ............ *H04N 1/3935* (2013.01); *G06K 15/128* (2013.01); *G06K 15/1868* (2013.01); *G06K 15/1873* (2013.01); *H04N 1/113* (2013.01); *H04N 2201/04787* (2013.01); *H04N 2201/04791* (2013.01)

(58) Field of Classification Search
None
See application file for complete search history.

(56) References Cited

U.S. PATENT DOCUMENTS

| 7,770,998 | B2 | 8/2010 | Shinohara et al. |
| 8,085,431 | B2 | 12/2011 | Kishi |
| 8,174,735 | B2 * | 5/2012 | Kerxhalli et al. ............. 358/474 |
| 8,451,478 | B2 | 5/2013 | Tsunekawa |

(Continued)

FOREIGN PATENT DOCUMENTS

| JP | 2009-83472 | 4/2009 |
| JP | 2009-159434 | 7/2009 |

OTHER PUBLICATIONS

Office Action issued Feb. 18, 2014, in Japanese Patent Application No. 2010-061672, filed Mar. 17, 2010.

*Primary Examiner* — Paul F Payer
(74) *Attorney, Agent, or Firm* — Oblon, McClelland, Maier & Neustadt, L.L.P.

(57) ABSTRACT

An image forming apparatus includes: an acquiring unit; a resolution converting unit; a receiving unit; a position determining unit; a correcting unit; and a scaling unit. The acquiring unit acquires image data composed of a plurality of pixels; the scaling-factor determining unit determines a scaling factor of the acquired image data; the resolution converting unit converts a resolution of the acquired image data into a higher resolution than the resolution of the image data; the receiving unit receives a designation of a sub-scanning directional shift amount of a correction pixel to be corrected; a position determining unit performs a position determining process; and the scaling unit scales the image data at the determined scaling factor by causing the position determining unit and the correcting unit.

20 Claims, 24 Drawing Sheets

(56) References Cited

U.S. PATENT DOCUMENTS

| | | | |
|---|---|---|---|
| 8,630,015 B2 | 1/2014 | Kaima | |
| 2006/0072939 A1* | 4/2006 | Kremer et al. | 399/130 |
| 2008/0309951 A1 | 12/2008 | Kishi et al. | |
| 2009/0066981 A1* | 3/2009 | Kaima et al. | 358/1.9 |
| 2009/0168109 A1* | 7/2009 | Kishi | 358/3.27 |
| 2014/0085689 A1 | 3/2014 | Kaima | |

* cited by examiner

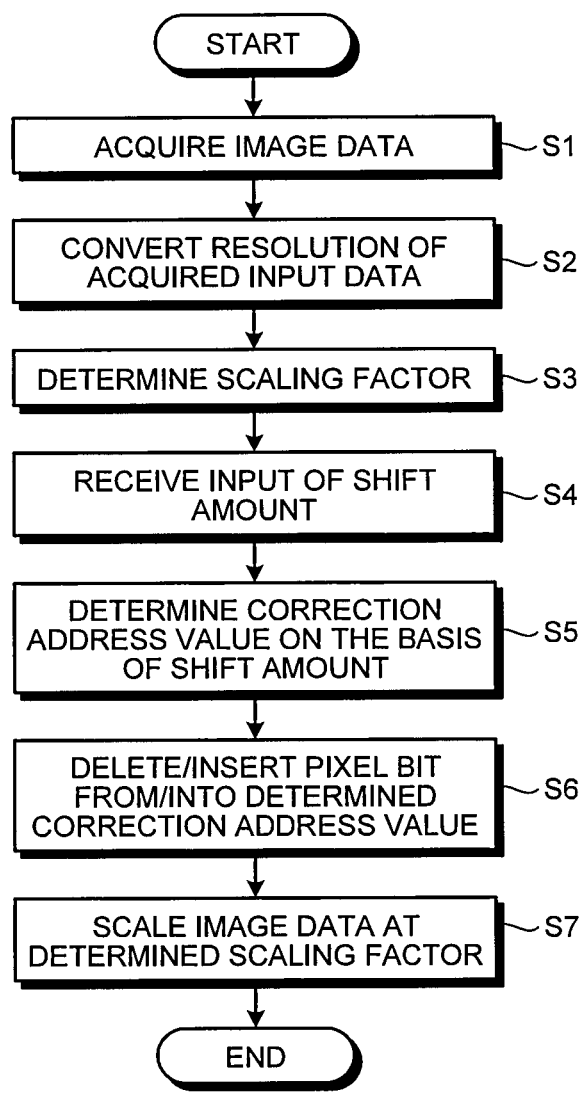

SCALE-DOWN PROCESS WHEN B>0

SCALE-DOWN PROCESS WHEN B<0

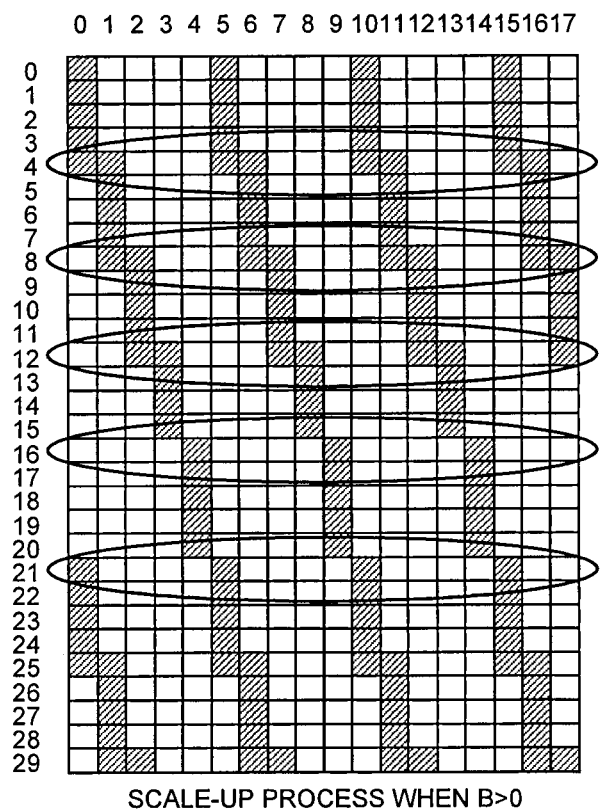
FIG.13A SCALE-UP PROCESS WHEN B>0
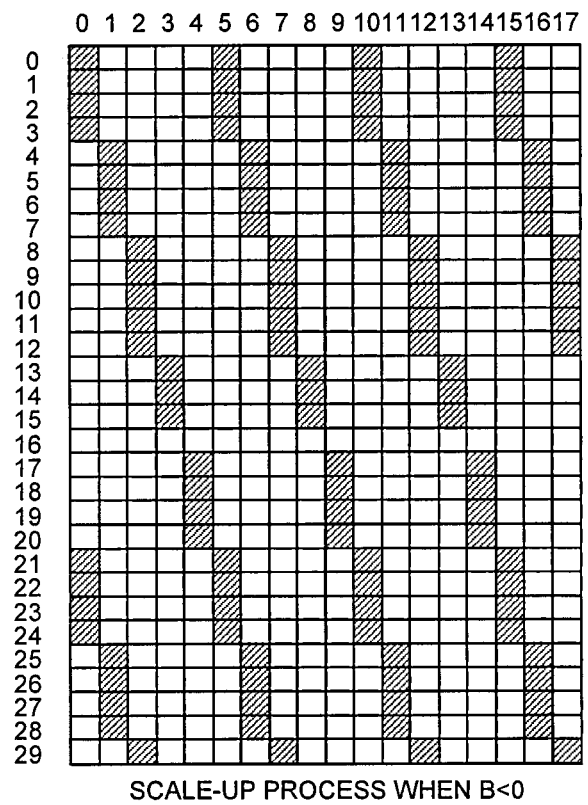
FIG.13B SCALE-UP PROCESS WHEN B<0

ORIGINAL IMAGE

RATE=20 B=4: CORRECTION PIXEL ADDRESS

RATE=20 B=3: CORRECTION PIXEL ADDRESS

RATE=20 B=4 AFTER CORRECTION SCALE-DOWN

RATE=20 B=3 AFTER CORRECTION SCALE-DOWN

RATE=20 B=4 AFTER CORRECTION SCALE-UP

RATE=20 B=3 AFTER CORRECTION SCALE-UP

FIG.19

| | | HALFTONE DOTS | | | |
|---|---|---|---|---|---|
| | | SCREEN ANGLE | | | |
| | RATE [1/SCALING FACTOR] | 0° | 18° | 72° | 90° |
| SCALE-UP | 124 | OFFSET=0 B=31 | OFFSET=0 B=29 | OFFSET=0 B=27 | OFFSET=0 B=33 |
| | 128 | OFFSET=0 B=32 | OFFSET=0 B=30 | OFFSET=0 B=29 | OFFSET=0 B=34 |
| | ### | ### | ### | ### | ### |
| | ### | ### | ### | ### | ### |
| | ### | ### | ### | ### | ### |
| | 1936 | OFFSET=0 B=88 | OFFSET=0 B=87 | OFFSET=0 B=85 | OFFSET=0 B=91 |
| | 4096 | OFFSET=0 B=128 | OFFSET=0 B=127 | OFFSET=0 B=125 | OFFSET=0 B=129 |
| OFF | - | - | - | - | - |
| SCALE-UP | 4096 | OFFSET=0 B=128 | OFFSET=0 B=127 | OFFSET=0 B=125 | OFFSET=0 B=129 |
| | 1936 | OFFSET=0 B=88 | OFFSET=0 B=87 | OFFSET=0 B=85 | OFFSET=0 B=91 |
| | ### | ### | ### | ### | ### |
| | ### | ### | ### | ### | ### |
| | ### | ### | ### | ### | ### |
| | 128 | OFFSET=0 B=32 | OFFSET=0 B=30 | OFFSET=0 B=29 | OFFSET=0 B=34 |
| | 124 | OFFSET=0 B=31 | OFFSET=0 B=29 | OFFSET=0 B=27 | OFFSET=0 B=33 |

IMAGE FORMING APPARATUS AND METHOD FOR SCALING IMAGE DATA BY A CORRECTION PIXEL

CROSS-REFERENCE TO RELATED APPLICATIONS

This application is a continuation of U.S. application Ser. No. 13/043,666, filed Mar. 9, 2011, which claims benefit of priority from Japanese Patent Application No. 2010-061672 filed in Japan on Mar. 17, 2010, the entire contents of both of which are incorporated herein by reference.

BACKGROUND OF THE INVENTION

1. Field of the Invention

The present invention relates to image formation, and more particularly, to an image forming apparatus and an image forming method for forming a latent image with multiple beams.

2. Description of the Related Art

With the functional advancement of an image forming apparatus, the image formation rate of the image forming apparatus per unit time, i.e., the number of prints per minute (PPM) increases. In recent years, to achieve formation of a higher-resolution image at a higher speed, an image forming apparatus which performs multi-beam exposure using a vertical cavity surface emitting laser (hereinafter, referred to as a "VCSEL") has been proposed. Furthermore, in response to a request for resource saving, a type of image forming apparatus capable of duplex printing has been available.

Therefore, in an automatic duplex printing apparatus, with improvement in the PPM, a time interval between printing an image on the first side of a sheet and printing an image on the second side tends to be shortened. For example, in high-speed types of duplex printing apparatuses, some apparatuses perform printing images on the first and second sides within 10 seconds.

When duplex printing is performed in such a state, in the case where an 80-micrometer-thick high-quality sheet is used as a printing sheet, it has been confirmed that a magnification difference of 0.2% to 0.4% between images printed on the first and second sides corresponding to the front and back of the sheet occurs due to changes in heat and humidity.

To cope with the above described problem, there has been conventionally disclosed a method to provide a sub-scanning magnification changing function to an image forming apparatus to eliminate a magnification difference so that the image forming apparatus can reduce an image by culling sub-scanning image data or enlarge an image by adding image data (for example, Japanese Patent Application Laid-open No. 2009-83472).

However, in the method disclosed in Japanese Patent Application Laid-open No. 2009-83472, it is impossible to resolve image deterioration caused in the image enlarging process. Specifically, there is a problem that the higher the resolution of an image to be formed, such as an image having the periodicity, for example, that a 1-line line is formed every 5 lines, the more conspicuously a global image defect, such as uneven density or moiré, appears when a line is culled or added to adjust the magnification.

Furthermore, with the process to eliminate a magnification difference, it is necessary to prevent banding caused by interference between a screen ruling and a magnification ratio or the like.

SUMMARY OF THE INVENTION

It is an object of the present invention to at least partially solve the problems in the conventional technology.

According to an aspect of the present invention, an image forming apparatus includes: an acquiring unit that acquires image data composed of a plurality of pixels; a scaling-factor determining unit that determines a scaling factor of the acquired image data; a resolution converting unit that converts a resolution of the acquired image data into a higher resolution than the resolution of the image data; a receiving unit that receives a designation of a sub-scanning directional shift amount of a correction pixel to be corrected; a position determining unit that performs a position determining process for determining a position of the correction pixel on the basis of the shift amount of which the designation is received; a correcting unit that performs a correction process for correcting the pixel in the determined position; and a scaling unit that scales the image data at the determined scaling factor by causing the position determining unit and the correcting unit to repeatedly perform the position determining process and the correction process with respect to each of sub-scanning lines of pixels and then repeatedly perform the position determining process and the correction process with respect to each of main-scanning lines of pixels.

According to another aspect of the present invention, an image forming method includes: acquiring image data composed of a plurality of pixels; determining a scaling factor of the acquired image data; converting a resolution of the acquired image data into a higher resolution than the resolution of the image data; receiving a designation of a sub-scanning directional shift amount of a correction pixel to be corrected; performing a position determining process for determining a position of the correction pixel on the basis of the shift amount of which the designation is received; performing a correction process for correcting the pixel in the determined position; and scaling the image data at the determined scaling factor by repeatedly performing the position determining process and the correction process with respect to each of sub-scanning lines of pixels and then repeatedly performing the position determining process and the correction process with respect to each of main-scanning lines of pixels.

According to still another aspect of the present invention, an image forming means includes: an acquiring means for acquiring image data composed of a plurality of pixels; a scaling-factor determining means for determines a scaling factor of the acquired image data; a resolution converting means for converting a resolution of the acquired image data into a higher resolution than the resolution of the image data; a receiving means for receiving a designation of a sub-scanning directional shift amount of a correction pixel to be corrected; a position determining means for performing a position determining process for determining a position of the correction pixel on the basis of the shift amount of which the designation is received; a correcting means for performing a correction process for correcting the pixel in the determined position; and a scaling means for scaling the image data at the determined scaling factor by causing the position determining unit and the correcting unit to repeatedly perform the position determining process and the correction process with respect to each of sub-scanning lines of pixels and then repeatedly perform the position determining process and the correction process with respect to each of main-scanning lines of pixels.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a flowchart showing a procedure of the scaling process performed by the image processing unit 342;

FIG. 13A is a diagram showing an example of image data that pixels are added by a scale-up process performed by the correcting unit 357;

FIG. 13B is a diagram showing another example of image data that pixels are added by a scale-up process performed by the correcting unit 357;

FIG. 19 is a diagram showing an example of a set-value table in which a set value of a shift amount B is associated with a dither screen angle.

DETAILED DESCRIPTION OF THE PREFERRED EMBODIMENTS

Exemplary embodiments of an image forming apparatus and an image forming method according to the present invention are explained in detail below with reference to the accompanying drawings. In the embodiments described below, there is shown an example in which the apparatus according to the present invention is applied to a multifunction peripheral (MFP) having at least two of a copy function, a printer function, a scanner function, and a facsimile function; however, the present invention is not limited to the above described example.

[First Embodiment]

Figure 1:
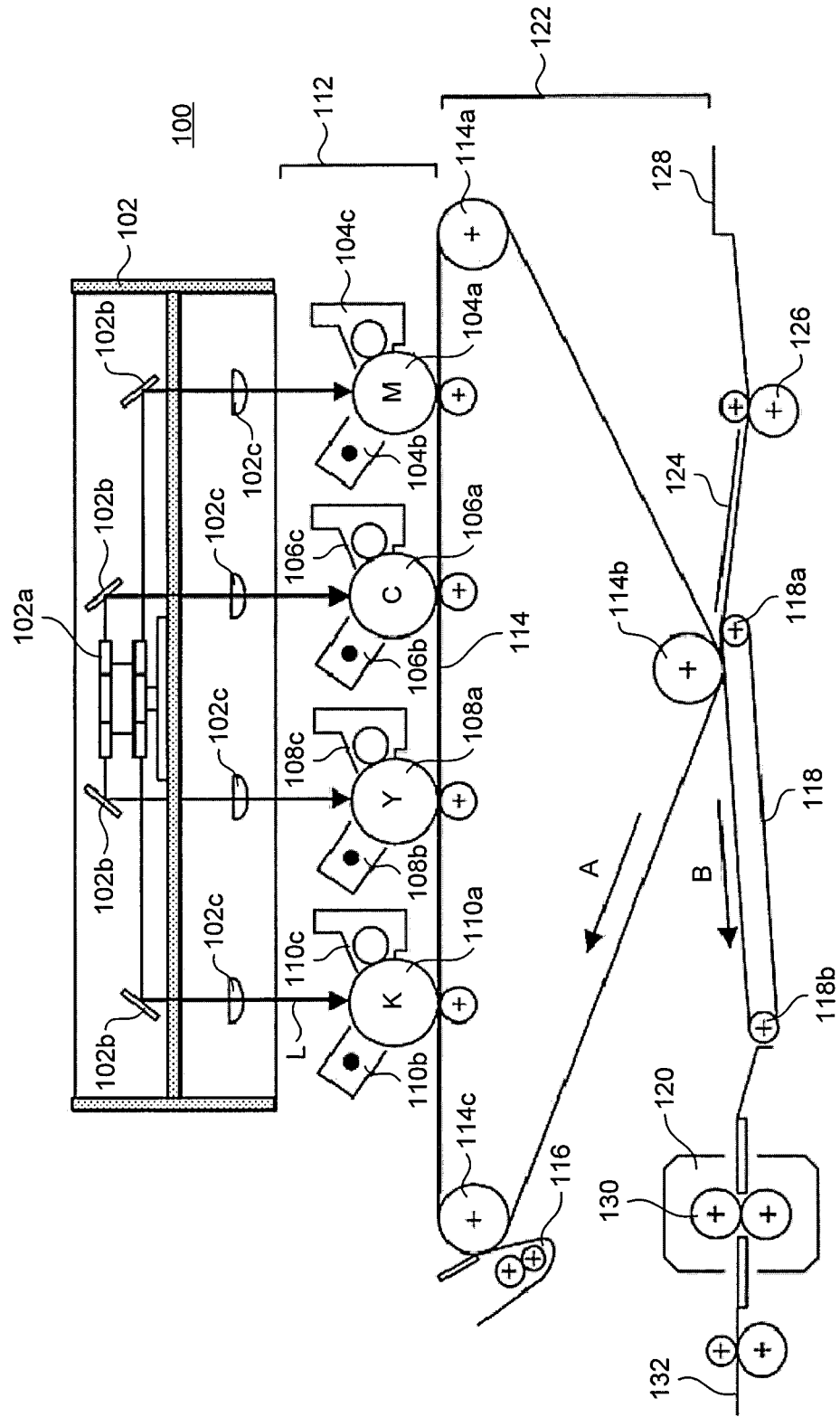
FIG. 1 is a schematic diagram illustrating a mechanical configuration of an image forming apparatus according to a first embodiment.

FIG. 1 is a schematic diagram illustrating a mechanical configuration of an image forming apparatus according to a first embodiment. As shown in FIG. 1, an image forming apparatus 100 according to the first embodiment mainly includes: an optical device 102 including optical elements such as a VCSEL 200 (see FIGS. 2 and 3) and a polygon mirror 102a; an image forming unit 112 including photosensitive drums charging devices, developing devices, and the like; and a transfer unit 122 including an intermediate transfer belt and the like. The optical device 102 includes the VCSEL 200 as a semiconductor laser. As shown in FIG. 1, light beams emitted from the VCSEL 200 (not shown in FIG. 1) are first collected by a first cylindrical lens (not shown), and deflected to a reflection mirrors 102b by the polygon mirror 102a.

Figure 2:
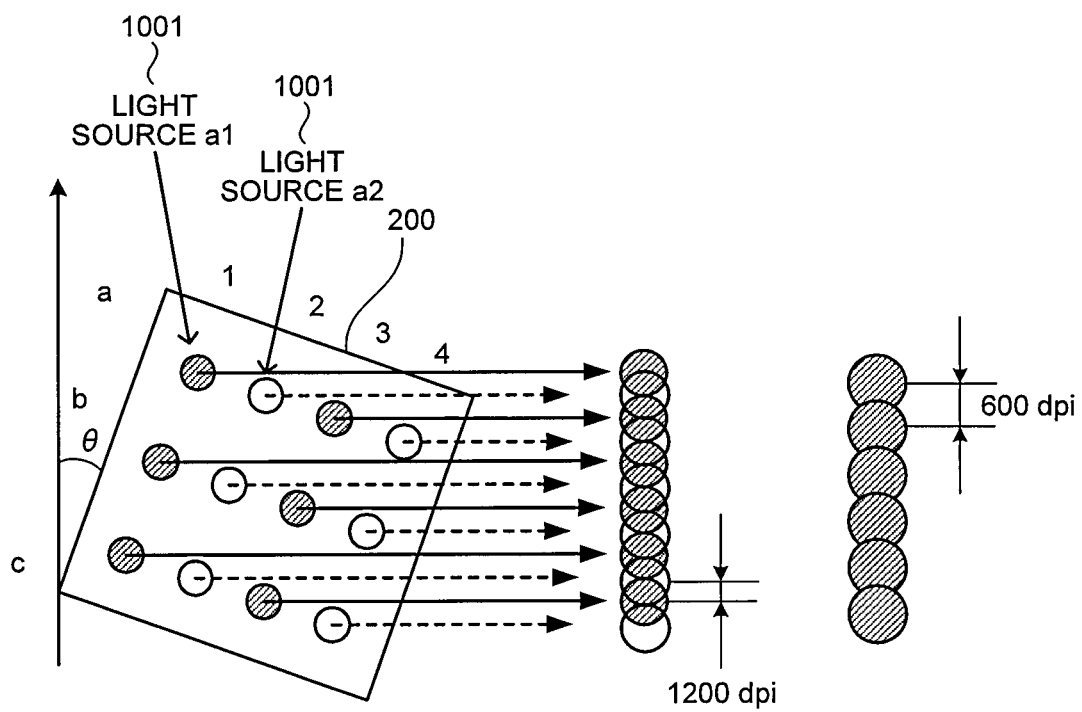
FIG. 2 is a configuration diagram of a VCSEL 200 incorporated in an optical device 102 according to the first embodiment.

The VCSEL 200 here is a surface-emitting semiconductor laser in which a plurality of light sources (semiconductor lasers) is arranged on the same chip in a lattice pattern. Various technologies for an image forming apparatus using such a VCSEL 200 are known; the optical device 102 of the image forming apparatus 100 according to the first embodiment incorporates the VCSEL 200 in a configuration similar to those of the publicly-known technologies. FIG. 2 is a configuration diagram of the VCSEL 200 incorporated in the optical device 102 according to the first embodiment. The VCSEL 200 according to the first embodiment is, as shown in FIG. 2, composed of a semiconductor laser array that a plurality of light sources 1001 (a plurality of semiconductor lasers) is arranged in a lattice pattern. The VCSEL 200 is installed so that an array direction of the plurality of light sources 1001 is tilted at a predetermined angle θ to a rotating shaft of the polygon mirror 102a provided as a deflector.

In FIG. 2, vertical arrays of the light sources are denoted by a to c, and lateral arrays are denoted by 1 to 4; for example, the top-left light source 1001 in FIG. 2 is denoted by a1. Since the light sources 1001 are obliquely arranged at a polygon mirror angle θ with respect to a sub-scanning direction, it is assumed that the light source a1 and the light source a2 expose different scanning positions to light, and a pixel (one pixel) is constructed by this two light sources, i.e., in FIG. 2, one pixel is achieved by two light sources. For example, when it is assumed that one pixel is constructed by the two light sources a1 and a2 and another one pixel is constructed by the two light sources a3 and a4, pixels as illustrated on the extreme right in FIG. 2 are formed by the light sources in the drawing. When the vertical direction in the drawing is set as the sub-scanning direction, a center-to-center distance between adjacent pixels each constructed by two light sources is equivalent to 600 dpi. At this time, a center-to-center distance between the two light sources constructing one pixel is equivalent to 1200 dpi, and the light-source density is twice as much as the pixel density. Therefore, by changing a light quantity ratio of light sources constructing one pixel, the position of the gravity center of the pixel can be displaced in the sub-scanning direction, and it is possible to achieve high-precision image formation.

The image forming apparatus 100 includes the post-object type optical device 102 which does not use an f-theta lens. In the embodiment shown in FIG. 1, light beams L respectively corresponding to cyan (C), magenta (M), yellow (Y), and black (K) image data are emitted, and reflected by the reflection mirrors 102b, and then again collected by second cylindrical lenses 102c, and after that, photosensitive drums 104a, 106a, 108a, and 110a are exposed to the light beams L, respectively.

Since the exposure of the light beams L is performed with use of a plurality of optical elements as described above, as for a main scanning direction and the sub-scanning direction, timing synchronization is performed. Incidentally, hereinafter, the main scanning direction is defined as a scanning direction of the light beams, and the sub-scanning direction is defined as a direction perpendicular to the main scanning direction.

Each of the photosensitive drums 104a, 106a, 108a, and 110a includes a photoconductive layer including at least a charge generation layer and a charge transport layer on a conductive drum made of aluminum or the like. The photoconductive layers are provided to correspond to the photosensitive drums 104a, 106a, 108a, and 110a, and applied with surface charges by charger units 104b, 106b, 108b, and 110b each including a corotron, a scorotron, or a charging roller, respectively.

Static charges applied to the photosensitive drums 104a, 106a, 108a, and 110a by the respective charger units 104b, 106b, 108b, and 110b are exposed to the light beams L, and electrostatic latent images are formed. The electrostatic latent images formed on the photosensitive drums 104a, 106a, 108a, and 110a are developed by developing units 104c, 106c, 108c, and 110c each including a developing sleeve, a developer supply roller, a control blade, and the like, respectively, and developer images are formed.

The developer images formed on the photosensitive drums 104a, 106a, 108a, and 110a are transferred onto an intermediate transfer belt 114, which moves in a direction of an arrow A in accordance with rotation of conveying rollers 114a, 114b, and 114c, in a superimposed manner. The superimposed C, M, Y, and K developer images (hereinafter, referred to as a "multicolor developer image") transferred onto the intermediate transfer belt 114 are conveyed to a secondary transfer unit in accordance with the movement of the intermediate transfer belt 114. The secondary transfer unit includes a secondary transfer belt 118 and conveying rollers 118a and 118b. The secondary transfer belt 118 moves in a direction of an arrow B in accordance with rotation of the conveying rollers 118a and 118b. An image receiving medium 124, such as high-quality paper or a plastic sheet, is fed from an image-receiving-media containing unit 128, such as a paper cassette, to the secondary transfer unit by a conveying roller 126.

The secondary transfer unit applies a secondary bias to the intermediate transfer belt 114, whereby the multicolor developer image on the intermediate transfer belt 114 is transferred onto the image receiving medium 124 attracted and held on the secondary transfer belt 118. The image receiving medium 124 is supplied to a fixing unit 120 in accordance with the movement of the secondary transfer belt 118. The fixing unit 120 includes a fixing member 130, such as a fixing roller made of silicon rubber or fluorine-contained rubber, and applies heat and pressure to the image receiving medium 124 and the multicolor developer image, and outputs the image receiving medium 124 as a printed material 132 to outside the image forming apparatus 100. After the multicolor developer image on the intermediate transfer belt 114 is transferred onto the image receiving medium 124, a cleaning unit 116 including a cleaning blade removes transfer residual developers from the intermediate transfer belt 114 to make ready for a next image forming process.

Figure 3:
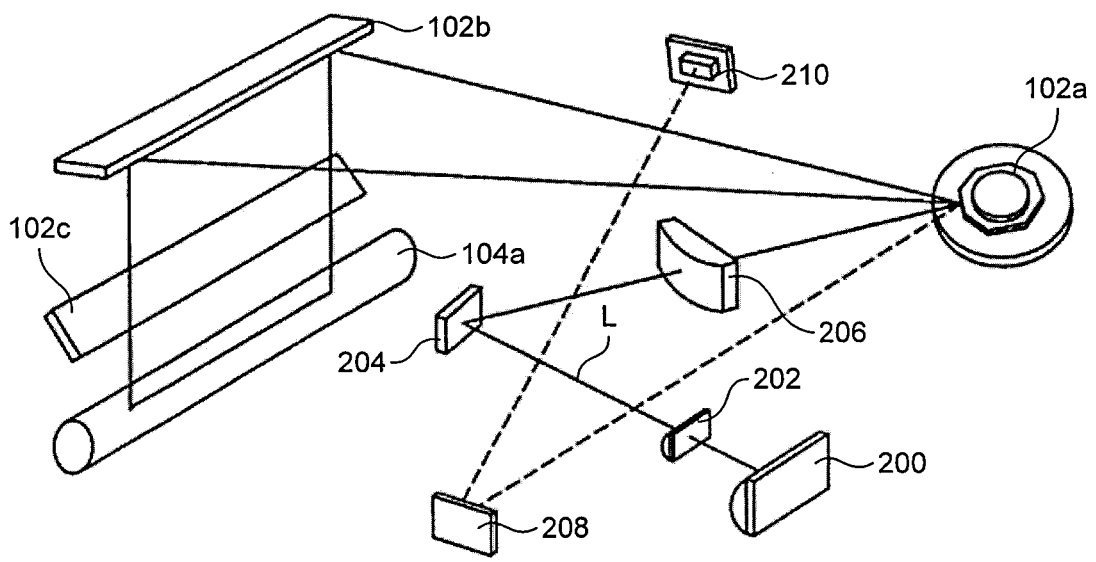
FIG. 3 is a schematic perspective view illustrating a case where the optical device 102 including the VCSEL 200 exposes a photosensitive drum 104a to a light beam.

FIG. 3 is a schematic perspective view illustrating a case where the optical device 102 including the VCSEL 200 exposes the photosensitive drum 104a to a light beam L. The light beam L emitted from the VCSEL 200 is collected by a first cylindrical lens 202 used to shape a light beam flux, and goes through a reflection mirror 204 and an imaging lens 206, and then is deflected by the polygon mirror 102a. The polygon mirror 102a is driven to rotate by, for example, a spindle motor which spins several thousand times to tens of thousands times. After the light beam L reflected by the polygon mirror 102a is reflected by the reflection mirror 102b, the light beam L is again shaped by the second cylindrical lens 102c, and the photosensitive drum 104a is exposed to the light beam L.

Furthermore, to synchronize a start timing of scanning in the sub-scanning direction by the light beam L, a reflection mirror 208 is arranged. The reflection mirror 208 reflects the light beam L to a synchronization detection device 210 including a photodiode and the like before the scanning in the sub-scanning direction is started. When detecting the light beam, the synchronization detection device 210 generates a synchronization signal to start sub-scanning, and synchronizes a process, such as a process of generating a drive control signal to the VCSEL 200.

The VCSEL 200 is driven by a pulse signal sent from a GAVD 310 to be described later, and as described later, the position on the photosensitive drum 104a corresponding to a predetermined image bit of image data is exposed to a light beam L emitted from the VCSEL 200, and an electrostatic latent image is formed on the photosensitive drum 104a.

Figure 4:
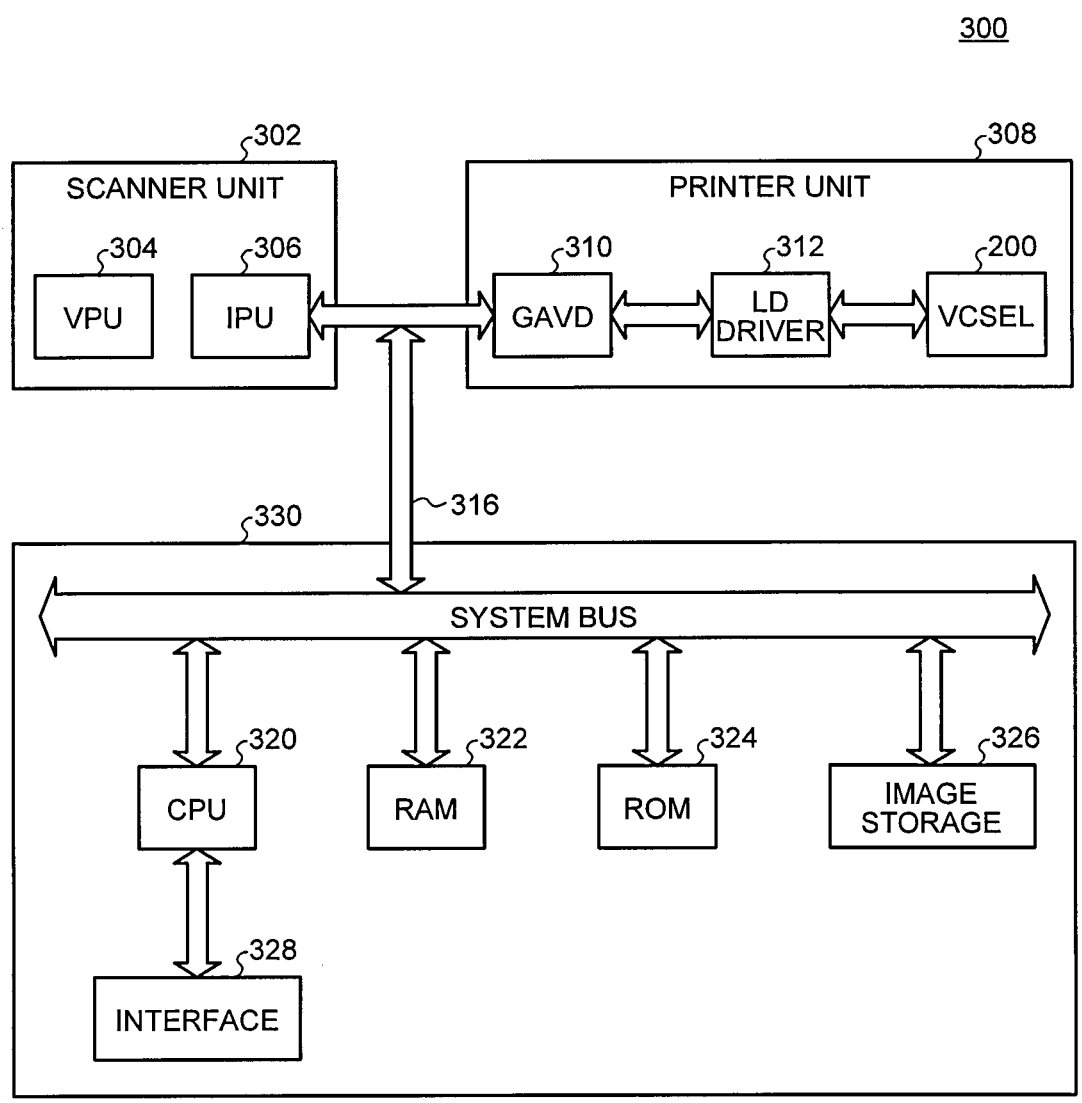
FIG. 4 is a schematic functional block diagram of a control unit 300 of the present image forming apparatus 100.

FIG. 4 is a schematic functional block diagram of a control unit 300 of the image forming apparatus 100. The control unit 300 includes a scanner unit 302, a printer unit 308, and a main control unit 330. The scanner unit 302 functions as a means for reading an image, and includes a VPU 304 and an IPU 306. The VPU 304 converts an analog signal read by a scanner into a digital signal, and performs a black offset correction, a shading correction, and a pixel location correction. The IPU 306 performs image processing mainly for converting the acquired image in the RGB color system into digital image data in the CMYK color system. The read image acquired by the scanner unit 302 is output as digital data to the printer unit 308. Here, the scanner unit 302 acquires image data of the front and back of an original, and stores digital data of the first side corresponding to the front of the original and digital data of the second side corresponding to the back of the original in a memory 340.

The printer unit 308 includes the GAVD 310, an LD driver 312, and the VCSEL 200. The GAVD 310 functions as a control means for performing the drive control of the VCSEL 200. The LD driver 312 supplies a current for driving a semiconductor laser element to the semiconductor laser element in response to a drive control signal generated by the GAVD 310. The VCSEL 200 mounts thereon two-dimensionally-arranged semiconductor laser elements. The GAVD 310 according to the first embodiment executes a resolution increasing process on image data transmitted from the scanner unit 302 by dividing pixel data in a size corresponding to the spatial size of the semiconductor laser elements of the VCSEL 200.

The scanner unit 302 and the printer unit 308 are connected to the main control unit 330 via a system bus 316, and image reading and image formation are controlled by a command from the main control unit 330. The main control unit 330 includes a central processing unit (CPU) 320 and a RAM 322. The RAM 322 provides a processing space used by the CPU 320 to process image data. Any CPUs that have been known can be used as the CPU 320; for example, a CISC (Complex Instruction Set Computer), such as the PENTIUM (registered trademark) series and a PENTIUM-compatible CPU, a RISC (Reduced Instruction Set Computer), such as the MIPS, and the like can be used. The CPU 320 receives an instruction from a user via an interface 328, and calls a program module for executing a process corresponding to the instruction to execute the process, such as copy, facsimile, scan, or image storage. The main control unit 330 further includes a ROM 324, and stores default setting data of the CPU 320, control data, a program, and the like in the ROM 324 so that the CPU 320 can use them. An image storage 326 is configured as a fixed or removable memory device, such as a hard disk device, an SD card, and a USB memory, and stores therein image data acquired by the image forming apparatus 100 so that the image data can be used for various processes instructed by a user.

When an image of image data acquired by the scanner unit 302 is output as an electrostatic latent image onto the photosensitive drum 104a or the like by driving the printer unit 308, the CPU 320 executes the main-scanning direction control and the sub-scanning position control of an image receiving medium, such as high-quality paper or a plastic film. To start scanning in the sub-scanning direction, the CPU 320 outputs a start signal to the GAVD 310. When the GAVD 310 receives the start signal, an IPU 306 starts a scanning process. After that, the GAVD 310 receives image data stored in a buffer memory or the like, and processes the received image data, and then outputs the processed image data to the LD driver 312. When receiving the image data from the GAVD 310, the LD driver 312 generates a drive control signal of the VCSEL 200. After that, the LD driver 312 sends the drive control signal to the VCSEL 200, thereby lighting up the VCSEL 200. Incidentally, the LD driver 312 drives the semiconductor laser elements by the use of the PWM control or the like. The VCSEL 200 described in the first embodiment includes eight channels of semiconductor laser elements; however, the number of channels of the VCSEL 200 is not limited to eight.

Figure 5:
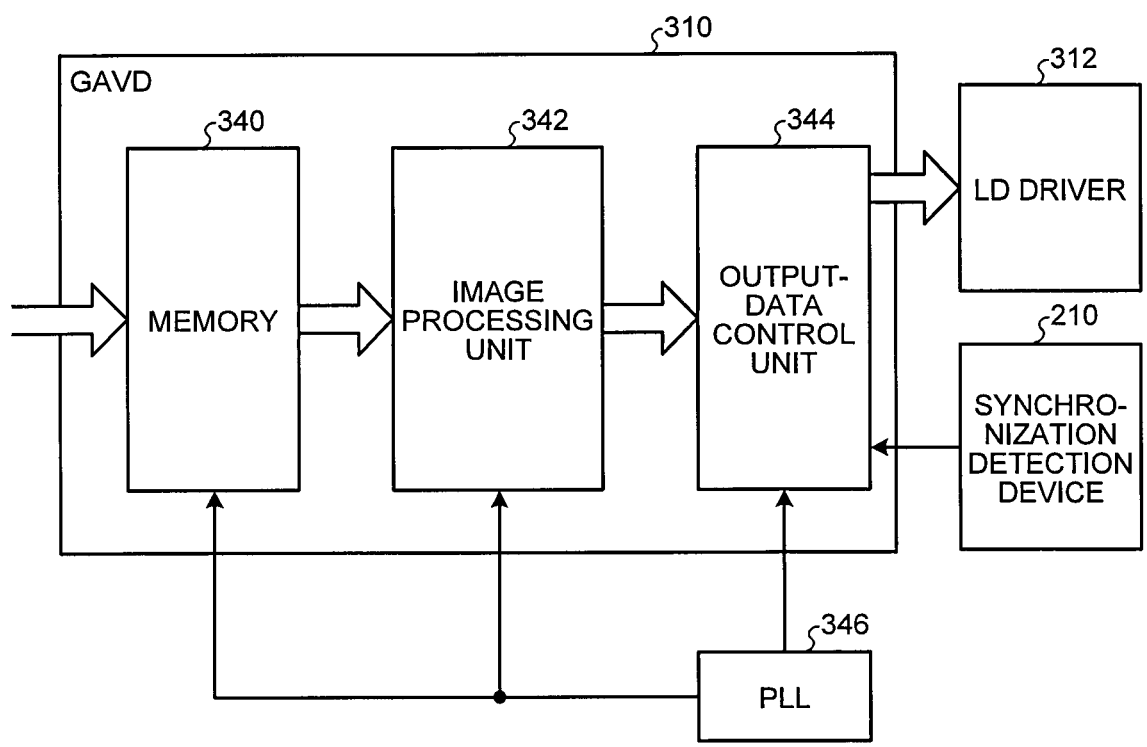
FIG. 5 is a detailed functional block diagram of a GAVD 310.

FIG. 5 is a detailed functional block diagram of the GAVD 310. The GAVD 310 receives a synchronization signal, and includes a memory 340 such as a FIFO buffer for storing and memorizing image data sent from the IPU 306, and passes the image data sent from the IPU 306 to an image processing unit 342 in a first-in first-out method. The image processing unit 342 reads out the image data from the memory 340, and executes a resolution conversion of the image data, assignment of the channel of the semiconductor laser element, and a process of adding/deleting an image bit (i.e., a correction pixel for scaling the image data up or down) (i.e., a correction process of the image data). The position on the photosensitive drum 104a exposed to a light beam corresponding to the image data is defined by a main-scanning line address value defining a line address value in the main-scanning direction and a sub-scanning line address value defining a line address value in the sub-scanning direction. Hereinafter, in the first embodiment, address coordinates are defined as a set of address values to which a specific image bit is given when image data is specified by a main-scanning line address value (an R address value) and a sub-scanning line address value (an F address value). Incidentally, as will be described below, these address values are determined by position determining unit 354. Furthermore, address coordinates are set by each row of pixels aligned in each main-scanning line and each sub-scanning line. An image path selector 358 to be described below performs a correction process, such as insertion of an image bit, with respect to a pixel located at an address of coordinates specified by an R address value and an F address value which is determined by the position determining unit 354 to be described below (i.e., at a pixel position) by each row of pixels.

An output-data control unit 344 converts output data, which is a write signal corresponding to the image data generated by the image processing unit 342, into a time-series drive pulse on the basis of the F address value and the sub-scanning speed, and generates a synchronization control signal for giving a synchronization signal to a synchronization detection device 210, and adds the generated synchronization control signal to the drive pulse. The generated drive control signal is transmitted to the LD driver 312, and the VCSEL (not shown) is driven. Furthermore, the output-data control unit 344 receives a synchronization signal from the synchronization detection device 210, and synchronizes the transmission of the drive control signal to the LD driver 312. Incidentally, processes of the memory 340, the image processing unit 342, and the output-data control unit 344 are synchronized with an operation clock from a PLL 346.

Figure 6:
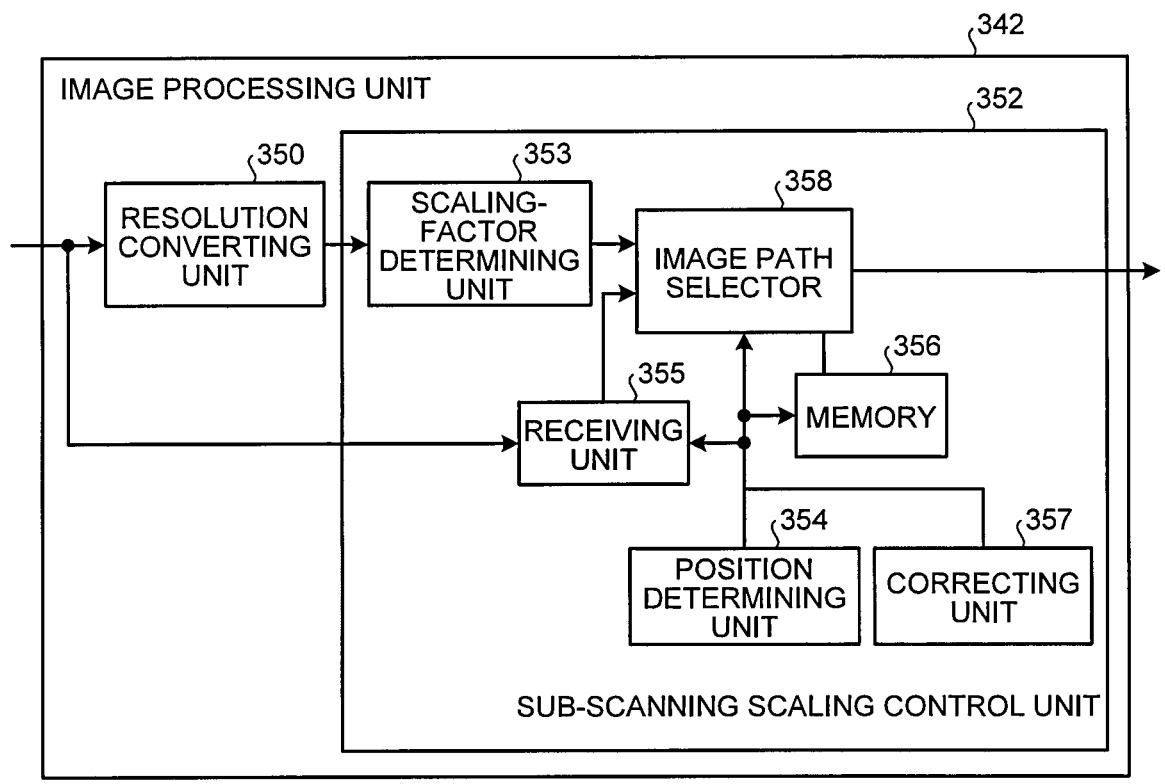
FIG. 6 is a functional block diagram of an image processing unit 342.

FIG. 6 is a functional block diagram of an image processing unit 342 according to the first embodiment. As shown in FIG. 6, the image processing unit 342 mainly includes a resolution converting unit 350 and a sub-scanning scaling control unit 352.

The resolution converting unit 350 creates divided pixels by dividing a unit pixel of image data acquired from the memory 340 in the corresponding size and number of channels of the VCSEL 200. After that, the resolution converting unit 350 assigns the channels of the laser elements, which emit laser beams to respective pixels, to the divided pixels. Furthermore, in the case of increasing the resolution, the resolution converting unit 350 selects a 2n-fold density process (n is a positive integer) or a 2n-line process, and determines the assignment of the channel of the laser element to be driven. In this case, the resolution converting unit 350 determines synchronous writing of a 1200-dpi input image for a plurality of lines by the eight channels of the VCSEL at an output resolution of 4800 dpi.

Figure 7:
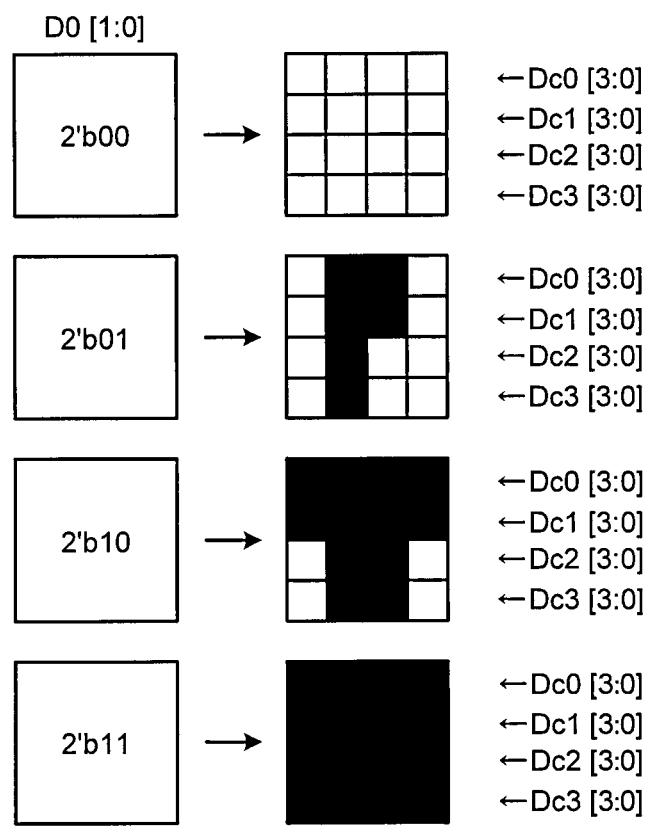
FIG. 7 is a schematic diagram for explaining a resolution increasing process performed by a resolution converting unit 350.

A resolution converting unit 350 converts input image data (hereinafter, referred to as "input data") into image data of a higher resolution (hereinafter, referred to as an "output resolution") than a resolution (hereinafter, referred to as an "input resolution") of an input image. FIG. 7 is a schematic diagram for explaining the resolution increasing process performed by the resolution converting unit 350. As shown in FIG. 7, the resolution converting unit 350 converts input data D0[1:0] illustrated on the left side of the diagram into output data Dc0[3:0] to Dc3[3:0] illustrated on the right side of the diagram depending on the density of the input data. In this case, the resolution converting unit 350 converts the input data D0[1:0] having an input resolution of 1200 dpi into the output data Dc0[3:0] to Dc3[3:0] having an output resolution of 4800 dpi. The resolution converting unit 350 processes other input data D1[1:0] to D5[1:0] in the same manner as the input data D0[1:0]. For example, the resolution converting unit 350 converts the input data D1[1:0] into output data Dc4[3:0] to Dc7[3:0].

The sub-scanning scaling control unit 352 mainly includes a scaling-factor determining unit 353, a position determining unit 354, a receiving unit 355, a memory 356, a correcting unit 357, and an image path selector 358.

The scaling-factor determining unit 353 obtains a scaling factor of first-side image data at the time of image processing of image data of the first side of a double-sided original, and determines a scaling factor of second-side image data on the basis of the obtained scaling factor of the first-side image data. Incidentally, a value of a difference between the scaling factor of the first-side image data and the scaling factor of the second-side image data determined by the scaling-factor determining unit 353 is minute. For example, when an 80-micrometer-thick high-quality sheet is used as a printing sheet, as described above, there occurs a magnification difference of 0.2% to 0.4% between images printed on the first and second sides of the printing sheet due to variations in heat and humidity. To eliminate the magnification difference, a different scaling factor from that of the first side is set. Furthermore, the scaling factor may be arbitrarily set.

The receiving unit 355 receives a designation of a shift amount, and stores the designated shift amount in the memory 356. The shift amount here means an amount of shift of a correction pixel to be corrected to the sub-scanning direction. For example, the receiving unit 355 receives input of a value of a shift amount from a user (a system engineer, etc.) via the interface 328. Incidentally, depending on data of a dithering process performed on image data, the user designates a value which does not interfere with a dither screen angle as a shift amount.

The image path selector 358 controls the position determining unit 354 and the correcting unit 357 so as to scale the image data up or down on the basis of the shift amount stored in the memory 356. Here, it is assumed that a scaling factor of the image data is the same value as the scaling factor determined by the scaling-factor determining unit 353. Incidentally, the image path selector 358 can scale image data of either one of the both sides of a double-sided original in a sub-scanning process. For example, there are a case where image data of the first side is scaled up and image data of the second side is not scaled, a case where image data of the first side is not scaled in the sub-scanning direction and image data of the second side is scaled down, a case where image data of the first side is scaled up and image data of the second side is scaled down, and the like.

The position determining unit 354 determines an address value of a correction pixel (hereinafter, referred to as a "correction address value"). The correction address value here means a set of an X-coordinate (hereinafter, referred to as an "R address value") and a Y-coordinate (hereinafter, referred to as an "F address value") indicating a position of image data to which an image bit is added or from which an image bit is deleted in an image scale-up process. Furthermore, the position determining unit 354 redetermines the position of a correction pixel on the basis of the shift amount received by the receiving unit 355.

The correcting unit 357 performs a correction by adding or deleting an image bit to/from a correction pixel corresponding to the correction address value determined by the position determining unit 354.

The image path selector 358 scales image data converted by the resolution converting unit 350 up or down. Specifically, the image path selector 358 obtains the determined correction address value from the position determining unit 354. Furthermore, the image path selector 358 determines whether an address value of a pixel to be processed includes the correction address value. For example, when an address value of a pixel to be processed includes the correction address value, the image path selector 358 generates a scale command signal, such as an add flag or a delete flag, and passes the generated scale command signal to the memory 356.

When the image path selector 358 determines that an address value of a pixel to be processed includes the correction address value, i.e., when a scale command signal is set, the image path selector 358 scales image data of the second side up or down on the basis of the shift amount received by the receiving unit 355.

On the other hand, when the image path selector 358 determines that an address value of a pixel to be processed does not include the correction address value, i.e., when a scale command signal is not set, the image path selector 358 selects input data from the resolution converting unit 350 on the basis of the shift amount obtained from the memory 356, and outputs the selected input data. Incidentally, in the first embodiment, when the 8-channel VCSEL 200 is used as a semiconductor laser, signals each indicating a position where an image bit is to be added or deleted and signals each indicating a shift amount are assigned to the eight channels (ch0 to ch7), respectively, and are used to drive the VCSEL 200. Incidentally, an appropriate operating part of the image processing unit 342 can be configured as a dedicated module for performing an image-bit adding/deleting process, or a part of another module can be configured to perform the image-bit adding/deleting process. Incidentally, the reason why it is configured to count the number of scale command signals is, when an image bit is shifted, to identify, for example, a position to which an image bit is first added in the second scanning after an image bit is added in the first scanning.

The memory 356 stores therein a shift amount of an image bit, and counts and holds the number of scale command signals used in a scaling process performed by the image path selector 358. Furthermore, the memory 356 holds a shift amount.

Figure 8A:
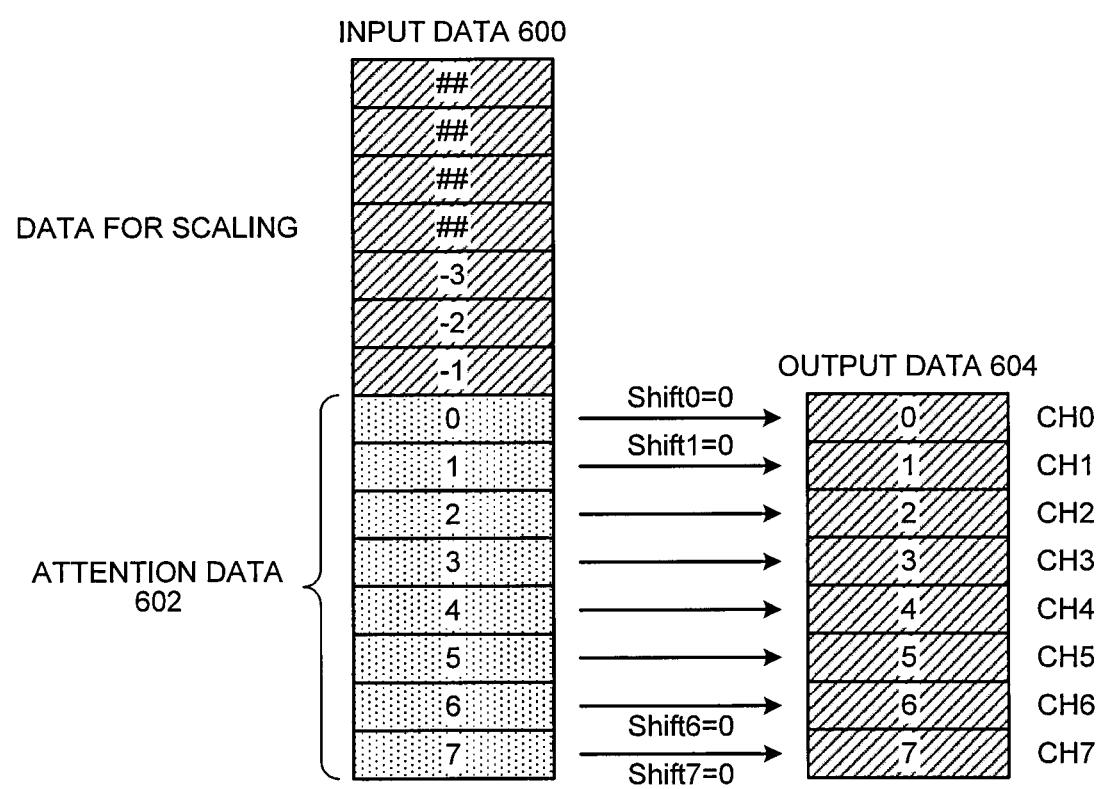
FIG. 8A is an explanatory diagram illustrating operation of an image path selector 358.
Figure 8B:
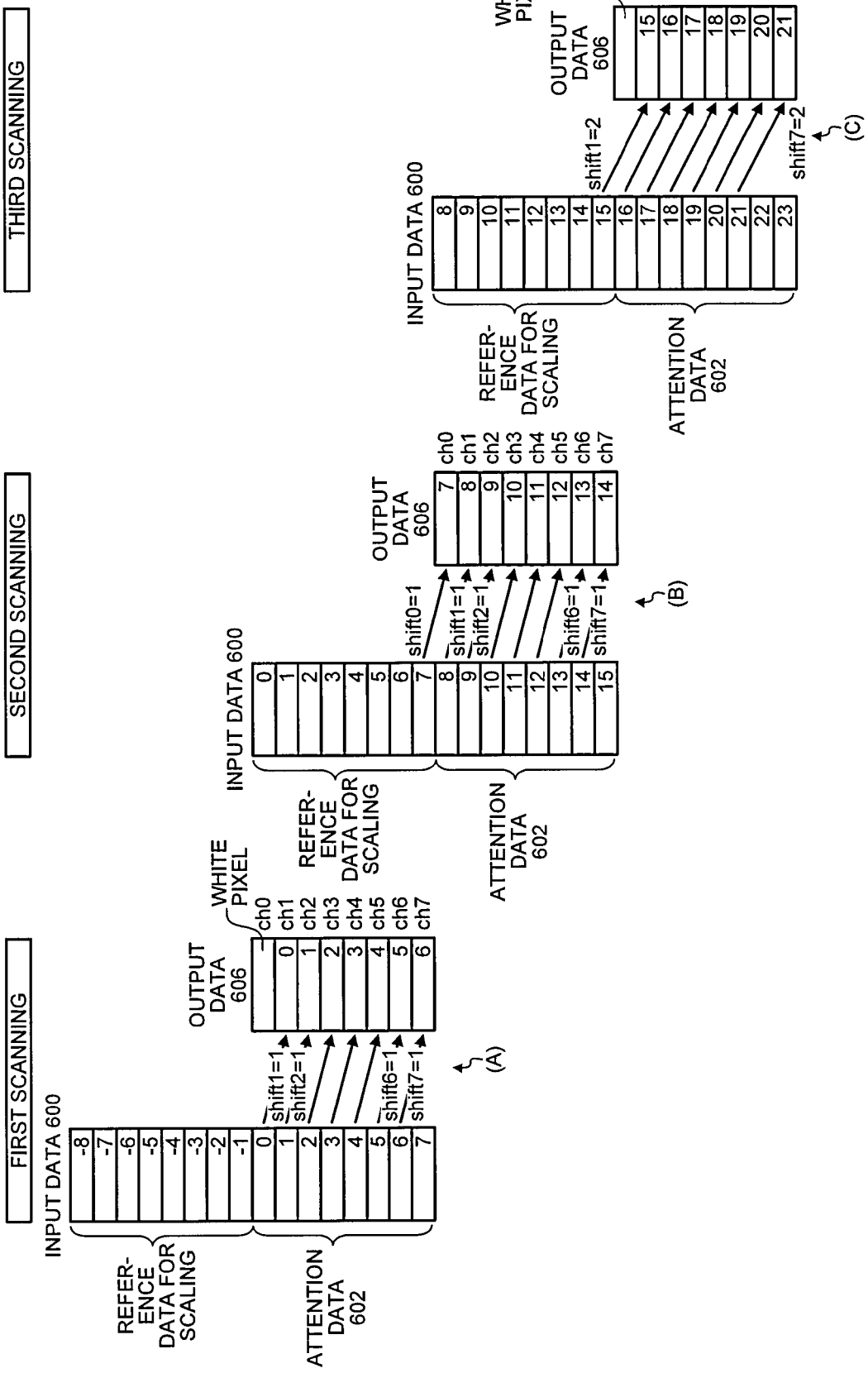
FIG. 8B is another explanatory diagram illustrating the operation of the image path selector 358.

Subsequently, operation of the image path selector 358 will be explained. FIGS. 8A and 8B are explanatory diagrams illustrating the operation of the image path selector 358. Attention data 602 shown in FIGS. 8A and 8B indicates a bit value for one pixel, and the data for 1-pixel is represented in Y-coordinates for the eight channels. The attention data 602 is bit data assigned to a specific main-scanning coordinate position. As input data 600, the attention data 602 and scaling data for specifying a unit of shift for sub-scanning scaling are constantly read out from the memory 340 on the preceding stage, and after the same process is performed on all the lines, the data is input to the resolution converting unit 350. In FIG. 8A, a scale command signal is not set, i.e., a scaling process is not performed, so a shift amount obtained from the memory 356 is zero (shift=0), and as illustrated in FIG. 8A, image data of the attention data 602 is passed as output data 604 which is a write signal in this embodiment.

Subsequently, the operation when a scale command signal is set is explained with reference to FIG. 8B. FIG. 8B illustrates a case where a white pixel is added to a Y-coordinate 1 of the attention data 602 in the first scanning (A). A signal indicating addition of an image bit is set with an address value corresponding to ch1, and bit data of ch1 is replaced so as to correspond to a white pixel and set as data in ch1 of output data 606. Then, a count value of 1 corresponding to the addition to ch1 is registered in the memory 356.

Data of ch2 to ch7 is each shifted to a Y-coordinate value by a channel shift amount of −1 as a value of a Y-coordinate of the output data 606. At this time, the image path selector 358 allocates bit data of the channel of the attention data corresponding to the channel shift amount of −1 to ch2 to ch7 of the output data 606, thereby adding an image bit. An image bit corresponding to white is added to the attention data in the output data 606, and the output data 606 is used as a write signal. The output-data control unit 344 converts the write signal in time series and generates a drive pulse for driving the VCSEL 200, and image formation is performed. The process described above is performed on a main-scanning basis, and data on the next pixel in the main-scanning direction is sequentially read out from the memory 340, and image formation in the main-scanning direction is performed.

As described above, in the first scanning (A), the Y-coordinate values of ch1 to ch7 of the output data 606 are shifted due to the addition of the white pixel; so in the second scanning (B), as shown in FIG. 8B, even when a white pixel is not added, Y-coordinate values of ch8 to ch15 of the output data 606 are shifted by −1; furthermore, in the third scanning (C), when a white pixel is added in the same manner as in the first scanning, as illustrated in FIG. 8B, sub-coordinate values of ch16 to ch23 of the output data 606 are shifted by −2.

Subsequently, a scaling process performed by the image processing unit 342 configured as described above will be explained. FIG. 9 is a flowchart showing a procedure of the scaling process performed by the image processing unit 342.

The resolution converting unit 350 acquires image data from the memory 340 (Step S1). The resolution converting unit 350 converts the acquired image data into image data having a higher resolution than that of the acquired image data (Step S2). The scaling-factor determining unit 353 determines a scaling factor of the image data converted by the resolution converting unit 350 (Step S3). At this time, the scaling factor is determined on the basis of a scaling factor of the first side. The receiving unit 355 receives input of a shift amount B (Step S4). The position determining unit 354 determines a correction address value on the basis of the input shift amount B (Step S5). Specifically, the position determining unit 354 calculates a correction address value by a calculus equation described below. The correcting unit 357 deletes or inserts a pixel bit from/into the correction address determined by the position determining unit 354 (Step S6). The image path selector 358 scales the image data at the scaling factor determined at Step S3 (Step S7).

Subsequently, the calculus equation used by the position determining unit 354 to determine the correction address value will be explained. When a correction address is denoted by (p, q); a cycle of a main-scanning process is denoted by S; and a shift amount in the sub-scanning direction is denoted by B, a Y-coordinate of a correction address (p+1, Y) of the closest row p+1 to the correction address (p, q) is determined by the following equation (1).

$$Y=q+B \tag{1}$$

Figure 10A:
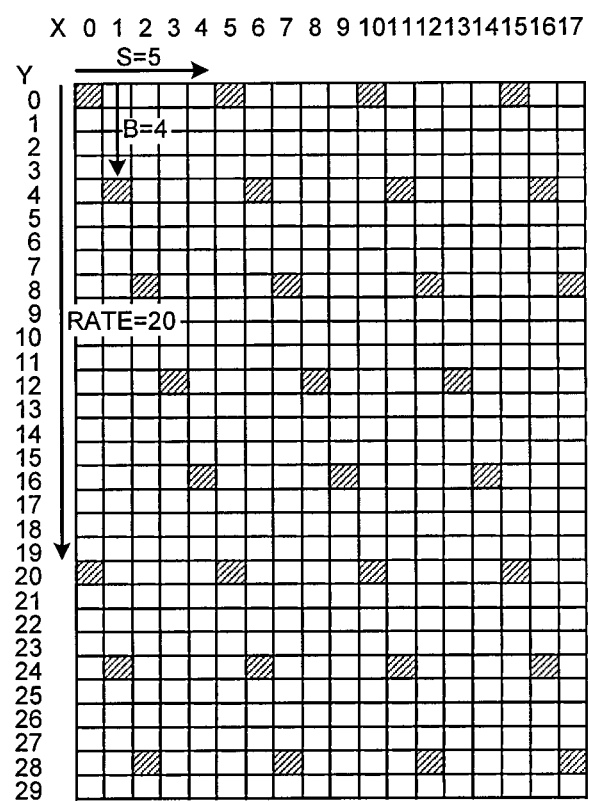
FIG. 10A is a diagram showing an example of a correction address when B≥0 is set.
Figure 10B:
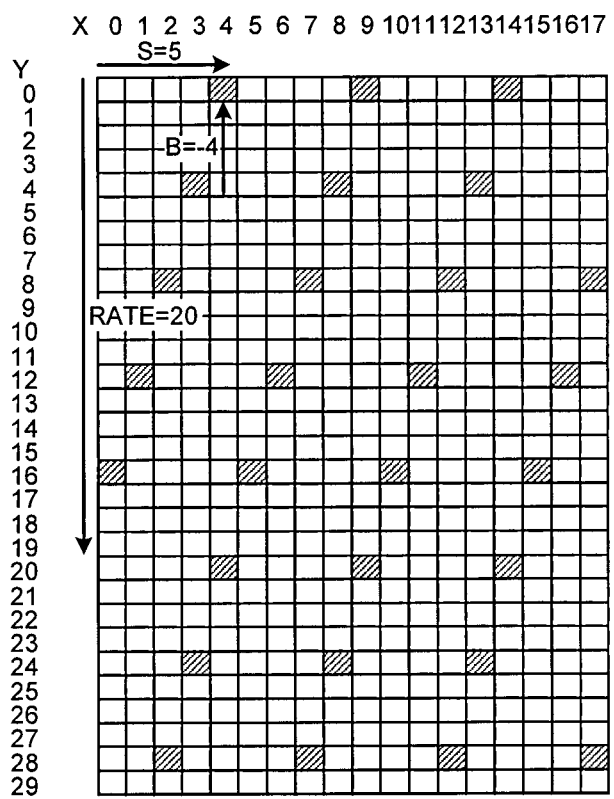
FIG. 10B is a diagram showing an example of a correction address when B<0 is set.

FIGS. 10A and 10B are diagrams that illustrate examples of the correction address. In FIG. 10A, it is assumed that B=4 and S=5 are set. First, a Y-coordinate of a correction address (1, Y) of the closest row p+1 to a correction address (0, 0) is 4 from the equation (1).

Furthermore, a pixel at (p+S, q), the same Y-coordinate as the correction address (p, q), is a correction pixel, and a scaling factor "rate" is calculated by the following equation (2).

$$(S \times B) = \text{rate} \tag{2}$$

Namely, "rate" is a value that is divisible by B. In FIG. 10A, rate=20 is obtained by the equation (2).

Then, a Y-coordinate of a correction address is calculated as follows. Here, it is assumed that a correction address of image data converted into a higher resolution is (p, Y), and a scaling factor of the image data is 1/rate. The shift amount B may be a positive value or a negative value. For example, in the case of B≥0, a Y-coordinate of a correction address is calculated by the following equations (3) to (5). Incidentally, "int" denotes a symbol of operation for obtaining an integral quotient; "%" denotes a symbol of operation for obtaining a remainder; "Z" denotes an arbitrary integer. A value of Z may be a predetermined value, or may be changed via the operation unit.

$$t1=B\times\{(p+Z)\% S\} \tag{3}$$

$$t2=\text{int}(Y/\text{rate})\times\text{rate} \tag{4}$$

$$Y=t1+t2 \tag{5}$$

Incidentally, FIG. 10A illustrates an example of the correction address when B≥0 is set.

Furthermore, in the case of B<0, a Y-coordinate of a correction address is calculated by the following equations (6) to (8).

$$t1=\text{rate}+B\times\{(p\%Z)+1\} \tag{6}$$

$$t2=\text{int}(Y/\text{rate})\times\text{rate} \tag{7}$$

$$Y=t1+t2 \tag{8}$$

Incidentally, FIG. 10B shows an example of the correction address when B<0 is set.

Figure 11:
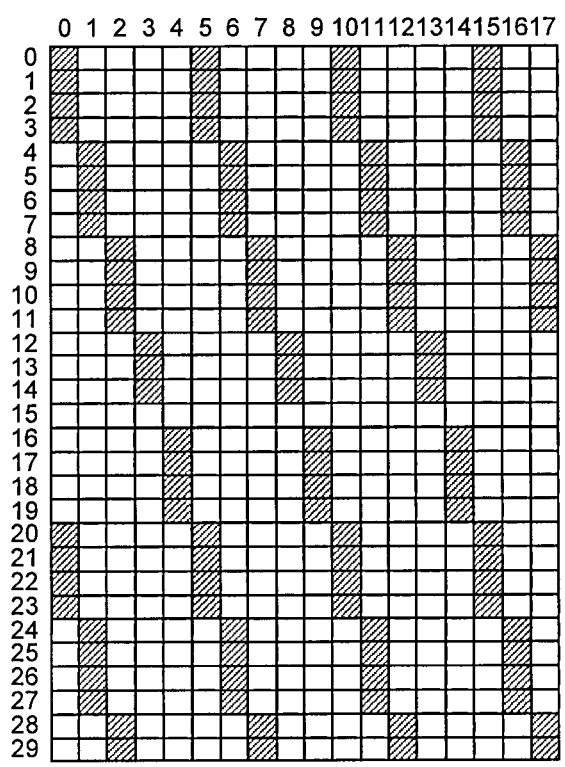
FIG. 11 is a diagram showing an example of an original image.
Figure 12A:
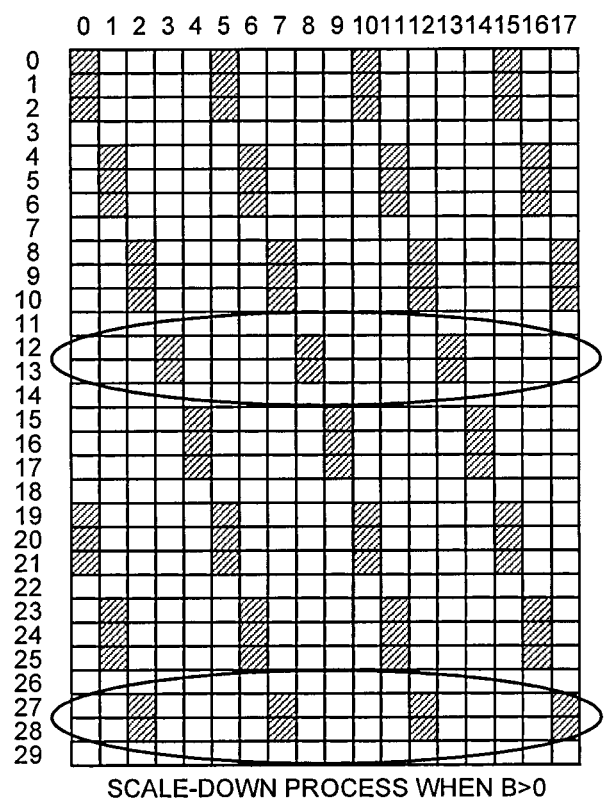
FIG. 12A is a diagram showing an example of image data that pixels are thinned out by a scale-down process performed by a correcting unit 357.
Figure 12B:
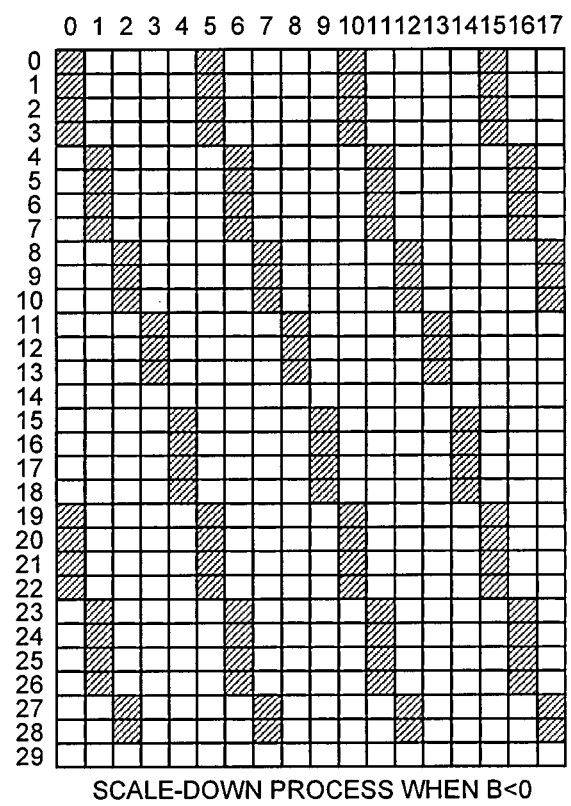
FIG. 12B is a diagram showing another example of image data that pixels are thinned out by a scale-down process performed by the correcting unit 357.

Subsequently, an example where pixels are thinned out by a scale-down process performed by the image path selector 358 is explained. FIG. 11 is a diagram showing an example of an original image. FIGS. 12A and 12B are diagrams showing examples of image data that pixels are thinned out by a scale-down process performed by the correcting unit 357. For example, when the image path selector 358 sets a screen angle and an angle of a sub-scanning scaling process to the same angle, the image density increases, and pixels become isolated dots as shown in FIG. 12A, and such isolated dots are periodically produced, resulting in banding. On the other hand, as in FIG. 12B, by setting to B<0 and changing the sub-scanning scaling angle, the appearance of banding can be reduced.

As described above, by changing a value of a shift amount B as in FIGS. 12A and 12B, a correction address value can be made symmetric, and interference with a dither screen angle can be prevented.

Subsequently, an example where pixels are added by a scale-up process performed by the image path selector 358 will be explained. FIGS. 13A and 13B are diagrams showing examples of image data in which pixels are added by a scale-up process performed by the correcting unit 357. In FIG. 13A, when the scale-up process is performed, an array of pixels that include two adjacent pixels aligned in the main-scanning direction as shown in the upper three round frames in the diagram and an array of pixels that include no such adjacent pixels aligned in the main-scanning direction as shown in the lower two round frames in the diagram are periodically produced, and this gives the appearance of banding. On the other hand, as in FIG. 13B, by setting to B<0, two adjacent pixels aligned in the main-scanning direction are not produced, and the uneven density resulting in banding becomes lessened.

In this manner, according to the first embodiment, a shift amount B is set with taking a dither screen angle into consideration in both a scale-down process and a scale-up process; therefore, it is possible to prevent interference with a dither screen angle and also possible to reduce the appearance of banding.

Second Embodiment

In the first embodiment, it is configured that a shift amount B can be arbitrarily set with taking a dither screen angle into consideration. Also in a second embodiment, a shift amount is set with taking a dither screen angle into consideration, and in addition, a shift amount B is set such that rate/B is an indivisible number. Furthermore, an offset is further taken into consideration to ensure avoidance of interference with a dither screen angle more certainly. The offset here means an arbitrarily-set fixed value.

The position determining unit 354 according to the second embodiment will be explained below. Incidentally, the units other than the position determining unit 354 have the same function and configuration as those in the first embodiment.

A calculus equation used by the position determining unit 354 to determine a Y-coordinate of a correction address is explained. The calculus equation is B×S≠rate, and B is a number that is not dividable by rate. The shift amount B may be a positive value or a negative value. For example, a Y-coordinate of a correction address is calculated by the following equations (9) to (11).

$$t1 = \text{offset} + (B \times p) \% \text{ rate} \quad (9)$$

$$t2 = \text{int}(Y/\text{rate}) \times \text{rate} \quad (10)$$

$$Y = t1 + t2 \quad (11)$$

Here, a correction address value when value of rate/B is set so that rate is not dividable by B is compared with a correction address value when a value of rate/B is set so that rate is dividable by B. For example, the example in FIG. 10A shows an address value when B=4 and rate=20, which means rate is dividable by B, and offset=0 are set. In this case, S=5 is obtained, which means a correction pixel appears at intervals of 5 pixels in the main-scanning direction.

Figure 14A:
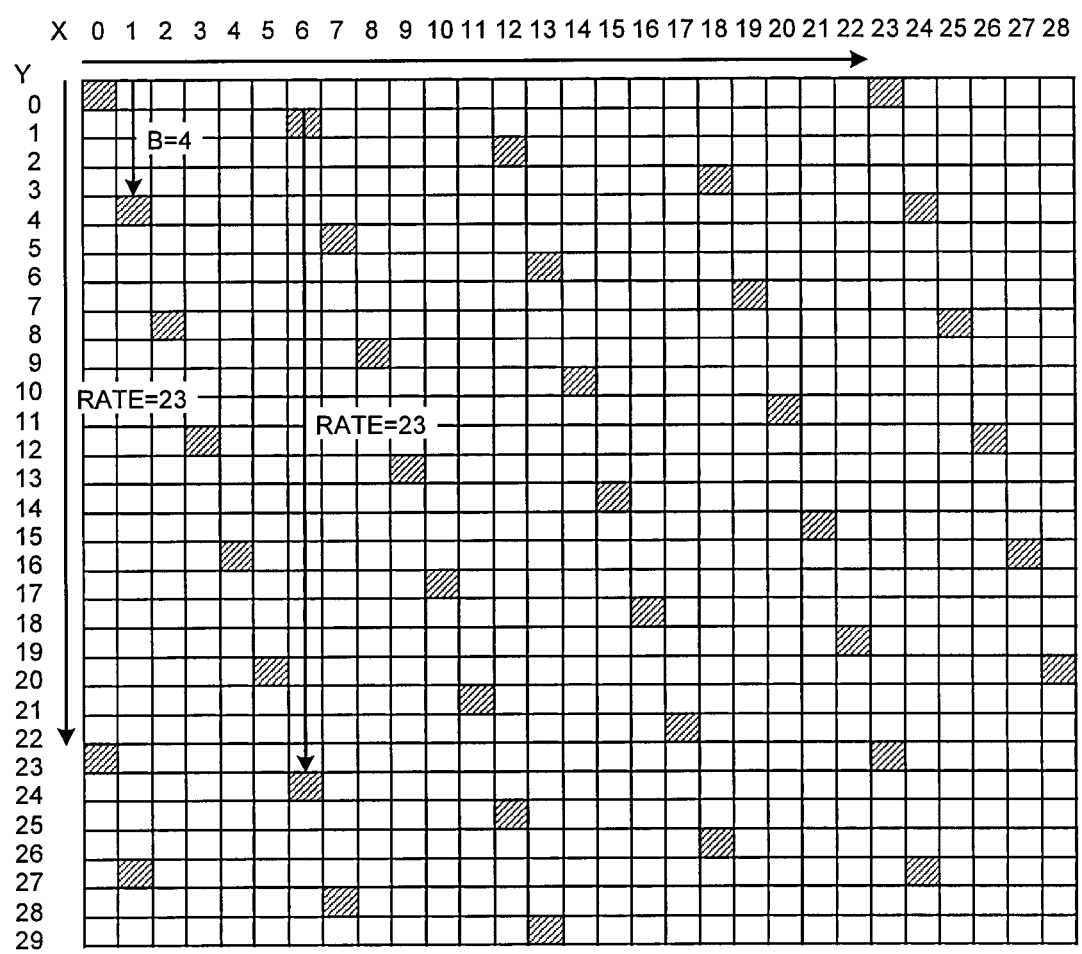
FIG. 14A is a diagram showing an example of a correction address value when values of rate and B are set so that rate is not dividable by B.

On the other hand, FIG. 14A is a diagram showing an example of a correction address value when a value of rate/B is set so that rate is not dividable by B. For example, FIG. 14A shows a correction address value when B=4 and rate=23, which means rate is not dividable by B, and offset=0 are set. Namely, a repetitive cycle of correction pixels in the main-scanning direction is S=23, and an angle of a correction address value can be changed flexibly. Therefore, it is possible to reduce the adverse effect due to interference with a dither screen angle.

Figure 14B:
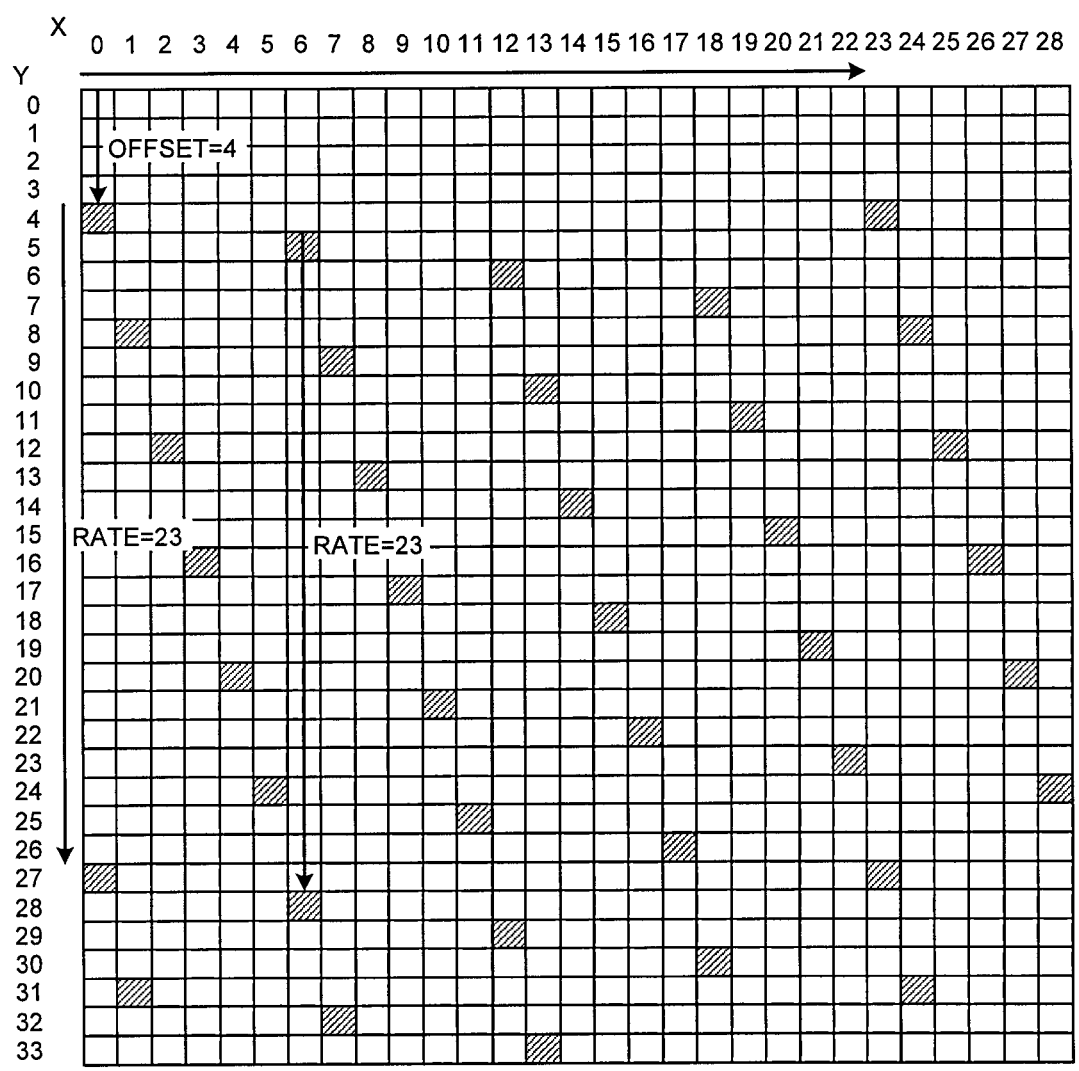
FIG. 14B is a diagram showing another example of a correction address value when values of rate and B are set so that rate is not dividable by B.

FIG. 14B is a diagram showing another example of a correction address value when a value of rate/B is set so that rate is not dividable by B in the same manner as in FIG. 14A. In FIG. 14A, offset=0 is set, and the image path selector 358 starts the process from a pixel at (0, 0). In FIG. 14B, offset=4 is set, and the image path selector 358 starts the process from a pixel at (0, 4) where an offset is shifted by 4 in the sub-scanning direction. In this manner, by shifting a coordinate where to start the process, interference with a dither screen angle can be avoided more certainly.

Figure 15:
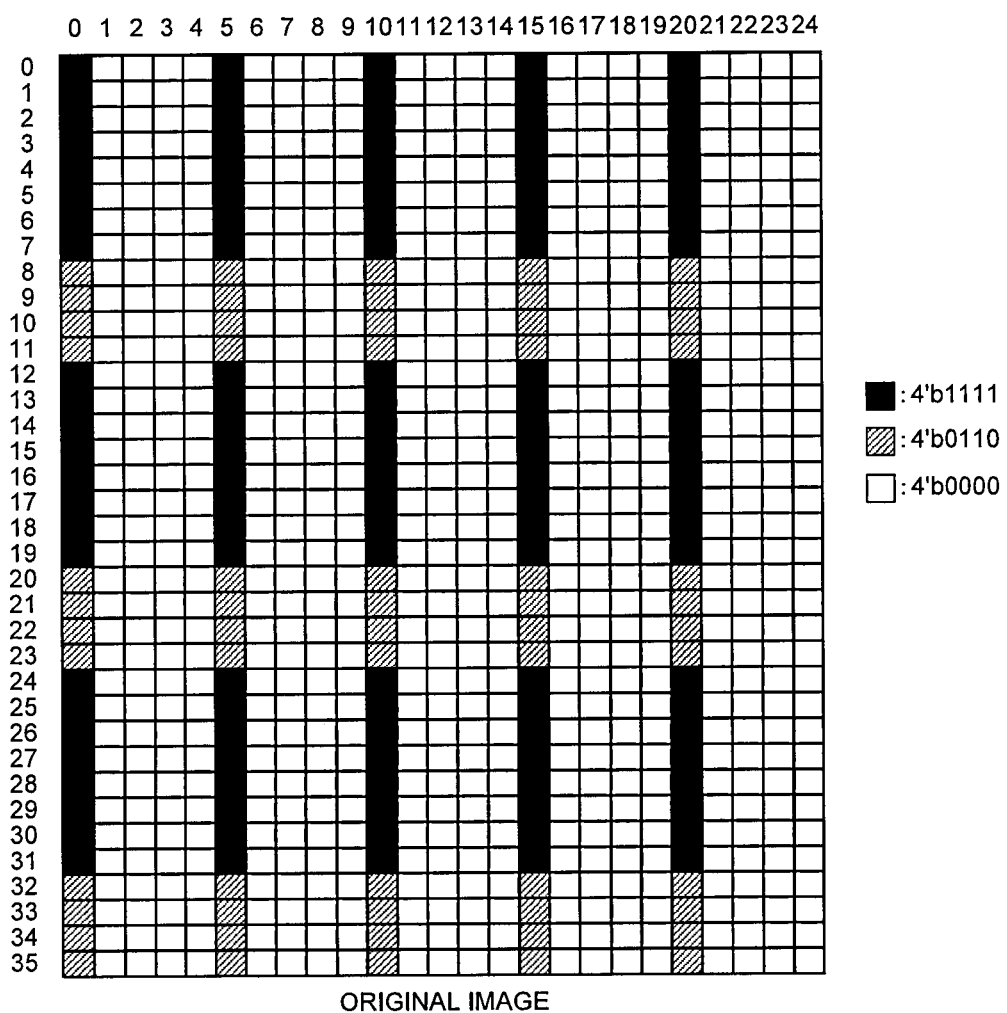
FIG. 15 is a diagram showing an example of an original image.

Subsequently, image data processed on the basis of a set shift amount B is explained with reference to FIGS. 15, 16A, and 16B. FIG. 15 is a diagram showing an example of an original image. In FIG. 15, a black-colored pixel denotes a black pixel (4'b1111), a white-colored pixel denotes a white pixel (4'b0000), and a pixel marked with diagonally left-down lines denotes a halftone pixel (4'b0110).

Subsequently, image data obtained by performing a correction of a scale-down process to the original image will be explained. First, FIGS. 16A and 16B are diagrams showing examples of a correction address value in the image data. FIG. 16A shows a correction address value when rate=20 and B=4 are set. FIG. 16B shows a correction address value when rate=20 and B=3 are set. Furthermore, in the same manner as in FIG. 15, a black-colored pixel denotes a black pixel (4'b1111), a white-colored pixel denotes a white pixel (4'b0000), a pixel marked with diagonally left-down lines denotes a halftone pixel (4'b0110), and a pixel marked with diagonally right-down lines denotes a correction pixel.

Figure 16A:
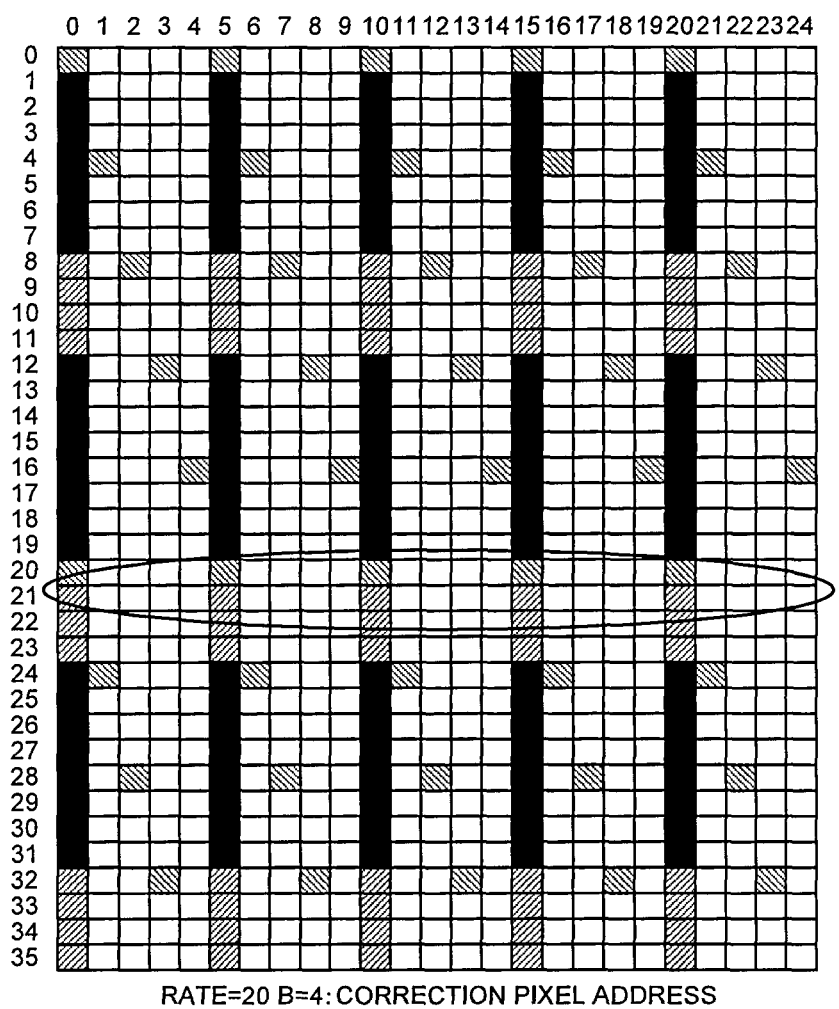
FIG. 16A is a diagram showing an example of a correction address value in image data.

As shown in a portion circled with a round frame in FIG. 16A, the image path selector 358 performs a thinning process intensively on halftone pixels marked with diagonally left-down lines. FIG. 17A is a diagram showing image data that correction pixels shown in FIG. 16A, i.e., correction pixels when rate/B is a dividable value are thinned out. FIG. 17B is a diagram showing image data that correction pixels shown in FIG. 16B, i.e., correction pixels when rate/B is not a dividable value are thinned out. In a case where correction pixels when rate=20 and B=4 are set as shown in FIG. 17A are thinned out from the original image shown in FIG. 15, as shown in a portion circled with a round frame in FIG. 17A, the pixel thinning process is intensively performed on halftone pixels marked with diagonally left-down lines. As a result, an edge which looks like a lateral line is periodically produced, resulting in banding. On the other hand, in FIG. 17B, unlike the portion circled with the round frame in FIG. 17A, halftone pixels marked with diagonally left-down lines are not intensively thinned out, and the appearance of banding can be reduced.

Figure 16B:
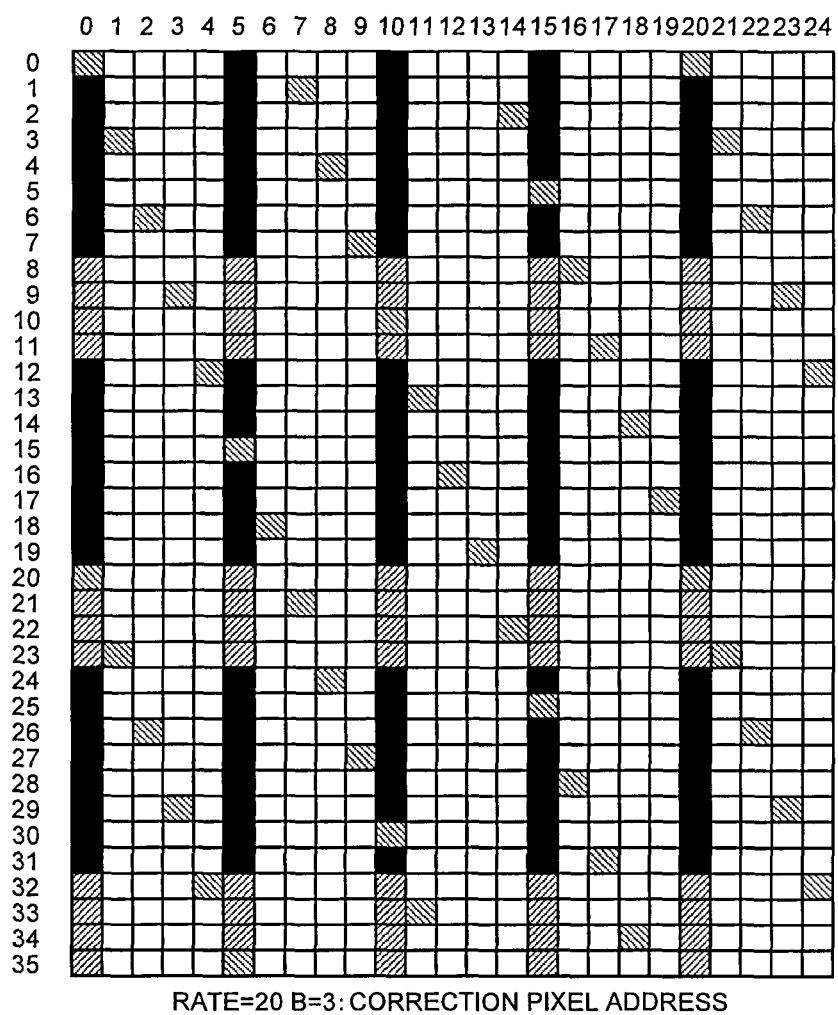
FIG. 16B is a diagram showing another example of a correction address value in image data.
Figure 17A:
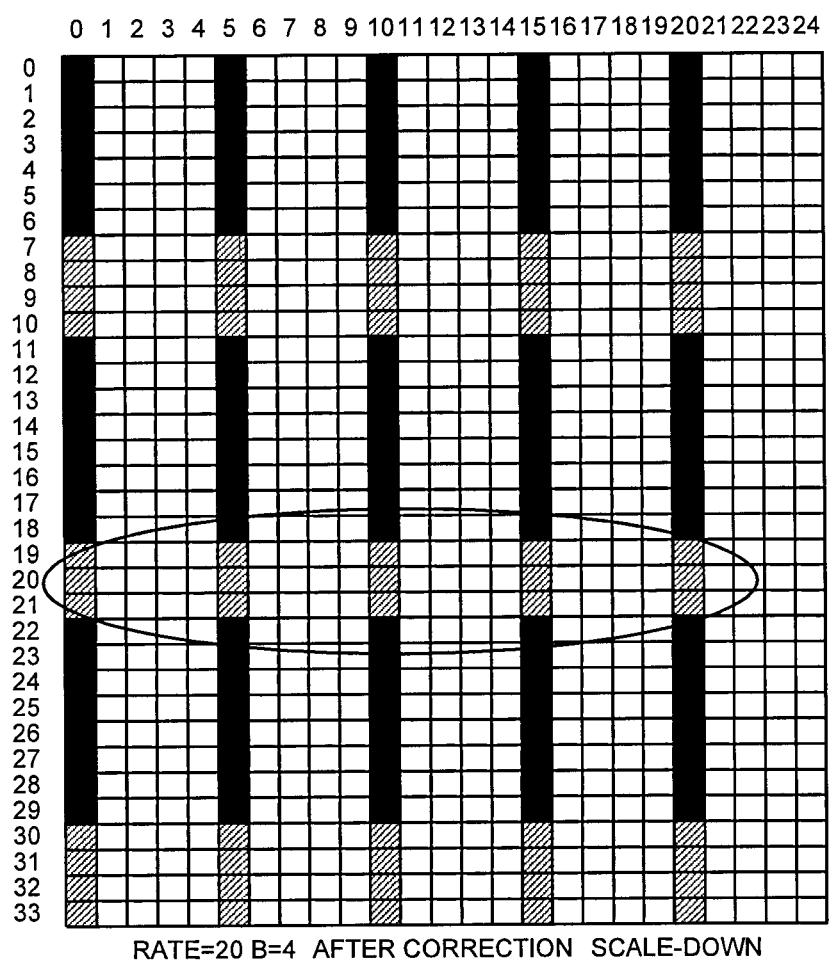
FIG. 17A is a diagram showing image data that correction pixels shown in FIG. 16A are thinned out.
Figure 17B:
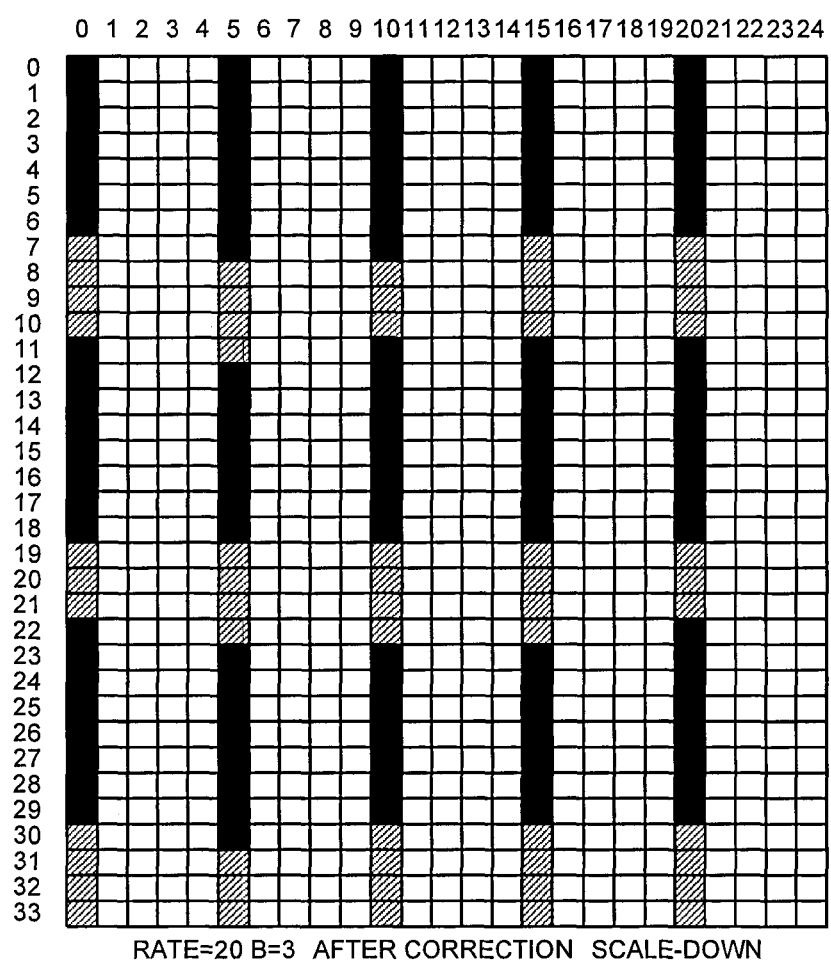
FIG. 17B is a diagram showing image data that correction pixels shown in FIG. 16B are thinned out.

Namely, in the examples of the image data shown in FIGS. 16A and 16B, there are four adjacent halftone pixels (4'b0110) aligned in the sub-scanning direction and eight adjacent black pixels (4'b1111) aligned in the sub-scanning direction. Furthermore, when a mass of the black pixels (4'b1111) is thinned out, the density is reduced by one-eighth of the density; on the other hand, when a mass of the halftone pixels (4'b0110) is thinned out, the density is reduced by one-quarter of the density, and a difference in density between the pixels included in the round frame and the pixels outside the round frame is produced, and banding appears on the image. However, by setting a value of rate/B so that rate is not dividable by B as in FIG. 17B, frequency of thinning low-density pixels of the original image can be reduced, and the appearance of banding can be reduced.

Figure 18A:
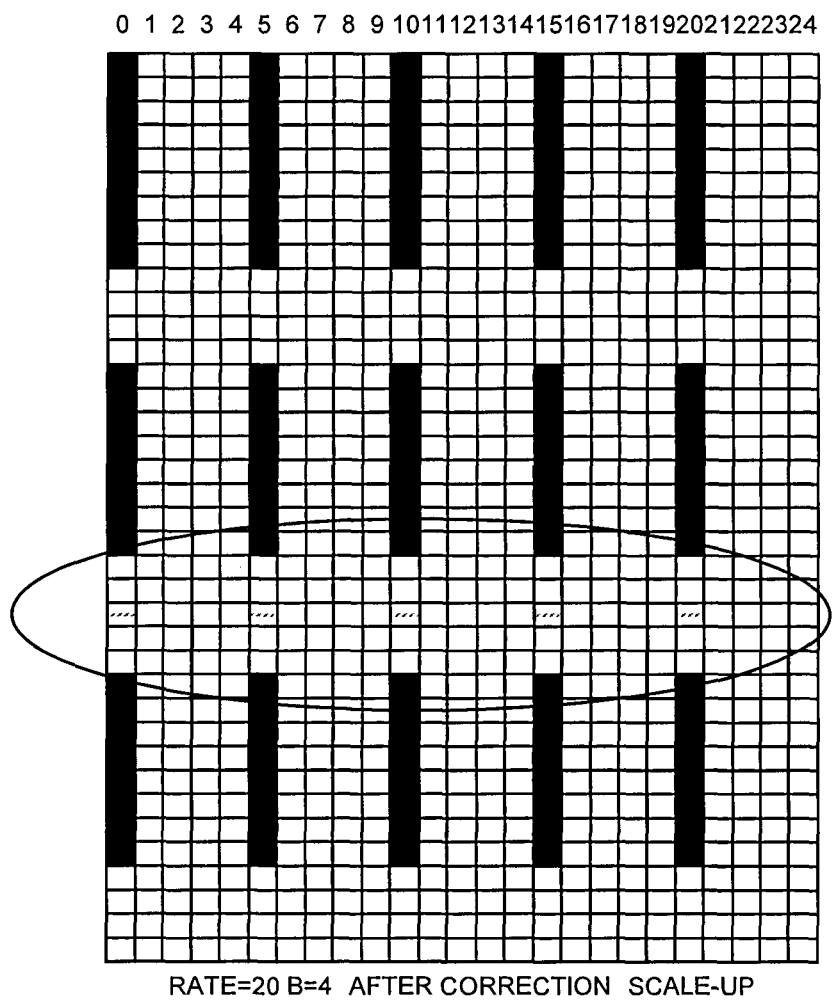
FIG. 18A is a diagram showing an example of image data that image data of the original image shown in FIG. 15 is scaled up by insertion of a pixel bit.
Figure 18B:
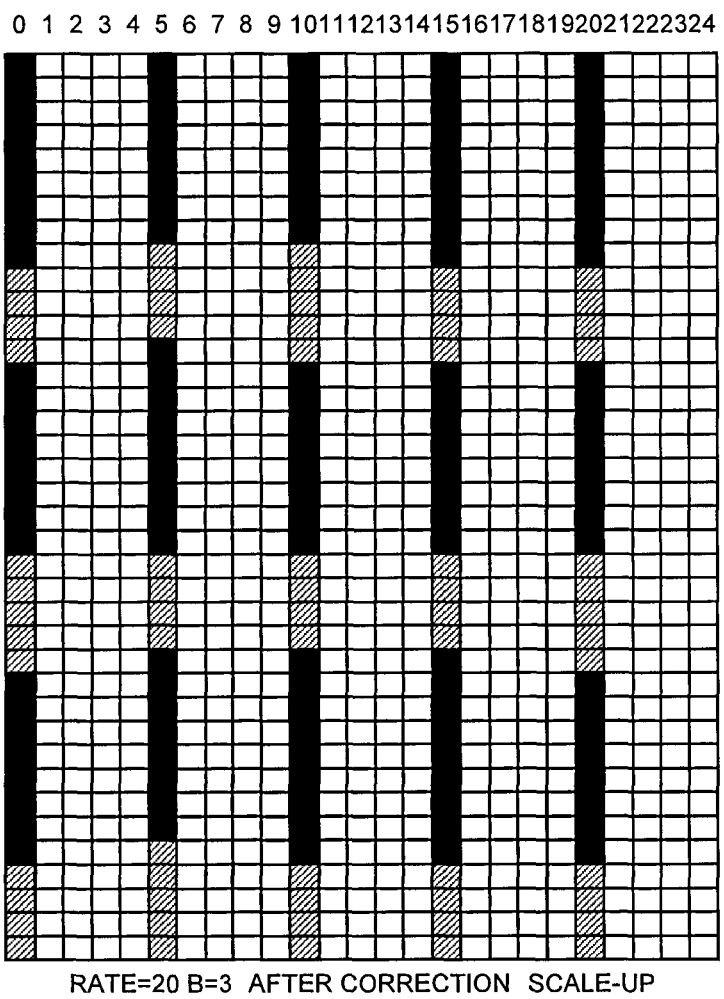
FIG. 18B is a diagram showing another example of image data that image data of the original image shown in FIG. 15 is scaled up by insertion of a pixel bit.

Subsequently, image data obtained by performing a correction of a scale-up process to the original image will be explained. FIGS. 18A and 18B are diagrams showing examples of image data that the image data of the original image shown in FIG. 15 is scale up by insertion of a pixel bit. FIG. 18A is the diagram showing image data into which the correction pixels shown in FIG. 16A, i.e., the correction pixels when rate/B is a dividable value are inserted. FIG. 18B is the diagram showing image data into which the correction pixels shown in FIG. 16B, i.e., the correction pixels when rate/B is not a dividable value are inserted. In FIG. 18A, a value of rate/B is set to be dividable, so also in the scale-up process, in the same manner as in the scale-down process, five continuous halftone pixels aligned in the main-scanning direction are produced by the scale-up process as shown in a portion circled with a round frame, and a difference in density among the halftone pixels is produced, a lateral line is produced.

On the other hand, in FIG. 18B, a value of rate/B is set to be indivisible. Therefore, five continuous halftone pixels aligned in the main-scanning direction are not produced, so no lateral line is produced, and the appearance of banding can be reduced.

In this manner, according to the second embodiment, a shift amount B is set such that rate/B is an indivisible number; therefore, a correction address that does not interfere with a dither screen angle can be determined, and as a result, the appearance of banding can be reduced.

Furthermore, in this manner, according to the second embodiment, a shift amount B is set using an offset; therefore, a correction address that does not interfere with a dither screen angle can be determined more flexibly.

Third Embodiment

In the first embodiment, the image path selector 358 arbitrarily sets a shift amount B. On the other hand, in a third embodiment, the image path selector 358 sets a shift amount B on the basis of a set-value table in which a set value of the shift amount B is preliminarily defined.

The memory 356 stores therein the set-value table. The set-value table here means a table in which a shift amount B is associated with predetermined data. The predetermined data includes data for each colorplate, dithering data, and the like. Incidentally, the units of the image processing unit 342 other than the memory 356 have the same function and configuration as those in the first embodiment.

FIG. 19 is a diagram showing an example of the set-value table in which a set value of a shift amount B is associated with a dither screen angle. In the set-value table shown in FIG. 19, a shift amount B with respect to a scaling factor of a line screen is associated with a dither screen angle. The image path selector 358 determines an offset and a shift amount B in the sub-scanning direction on the basis of a scaling factor 1/rate and a screen angle.

The memory 356 can store therein a set-value table for each dither shape. Incidentally, it can be configured that a screen angle, halftone dots, a line screen, and the like are changed by each color in a print mode, such as a photo mode or a text mode, via the operation unit (the interface 328) of the MFP or the like.

Furthermore, as another example, the receiving unit 355 receives an instruction to change an offset, a cycle S of the scaling process, and a shift amount B of set-value data stored in the memory 356. The receiving unit 355 receives an instruction to change these values from a user (a system engineer) via the operation unit (the interface 328).

In this manner, according to the third embodiment, set-value data is preliminarily stored in the memory 356; therefore, the image path selector can set a shift amount easily.

Furthermore, in this manner, according to the third embodiment, preliminarily-stored set values can be changed; therefore, the appearance of banding can be further reduced depending on image data.

Figure 20:
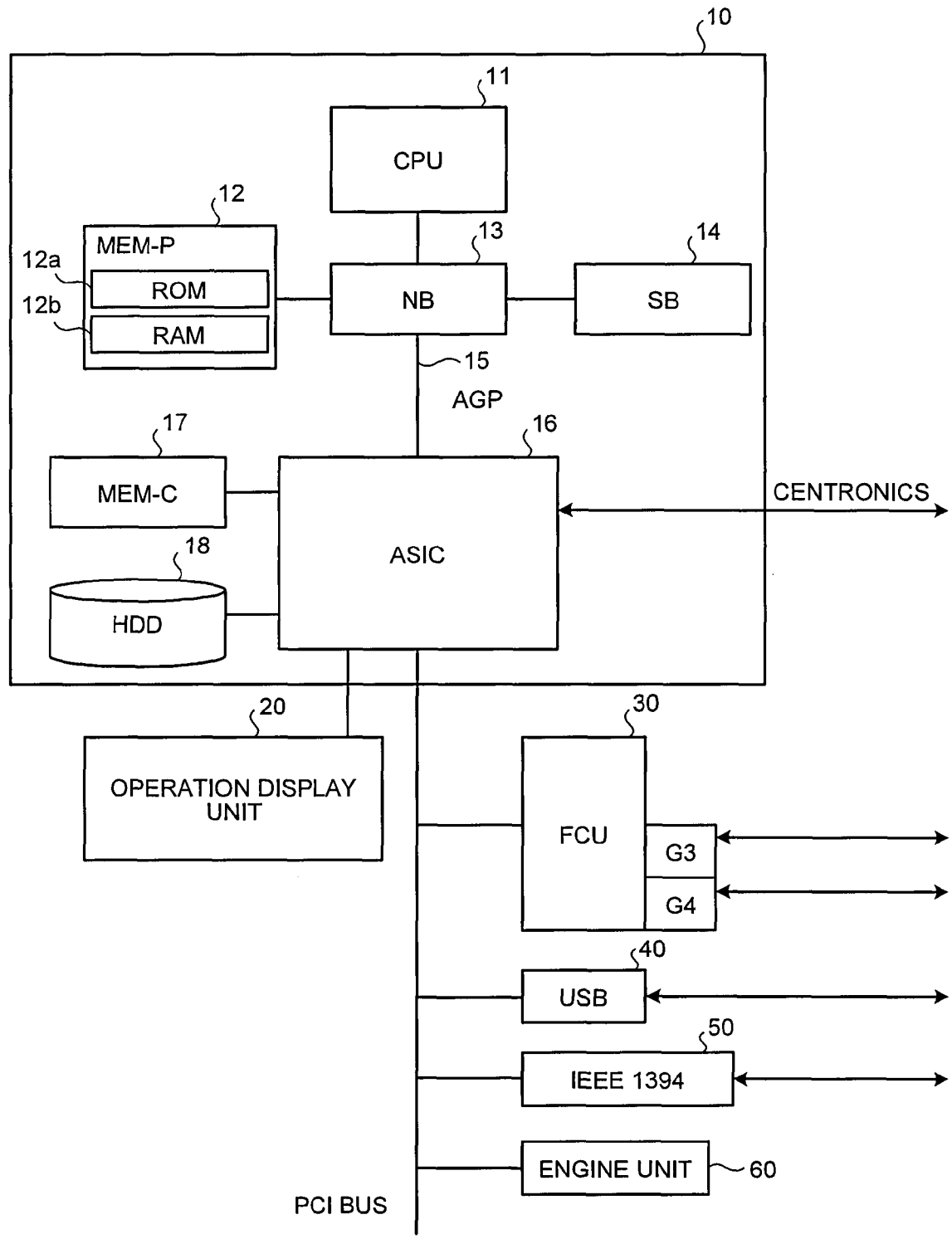
FIG. 20 is a block diagram illustrating a hardware configuration of the image forming apparatus 100 according to first to third embodiments.

FIG. 20 is a block diagram illustrating a hardware configuration of the image forming apparatus 100 according to the first to third embodiments. As shown in FIG. 20, the image forming apparatus 100 (hereinafter, referred to as the "MFP 100") includes a controller 10 and an engine unit 60. The controller 10 and the engine unit 60 are connected by a PCI (Peripheral Component Interface) bus. The controller 10 is a controller which controls the entire MFP 100 and controls drawing, communications, and input from the operation unit (not shown). The engine unit 60 is a printer engine which can be connected to the PCI bus, etc. For example, the engine unit 60 is a black-and-white plotter, a 1-drum color plotter, a 4-drum color plotter, a scanner, a fax unit, or the like. Incidentally, the engine unit 60 includes an image processing section for performing error diffusion, gamma conversion, or the like on an image in addition to the so-called engine section, such as a plotter.

The controller 10 includes a CPU 11, a North Bridge (NB) 13, a system memory (MEM-P) 12, a South Bridge (SB) 14, a local memory (MEM-C) 17, an ASIC (Application Specific Integrated Circuit) 16, and a hard disk drive (HDD) 18. The NB 13 and the ASIC 16 are connected by an AGP (Accelerated Graphics Port) bus 15. The MEM-P 12 includes a ROM (Read Only Memory) 12a and a RAM (Random Access Memory) 12b.

The CPU 11 controls the entire MFP 100, and has a chipset composed of the NB 13, the MEM-P 12, and the SB 14. The CPU 11 is connected to other devices via the chipset.

The NB 13 is a bridge for connecting the CPU 11 to the MEM-P 12, the SB 14, and the AGP bus 15, and includes a memory controller for controlling read/write with respect to the MEM-P 12 and the like, a PCI master, and an AGP target.

The MEM-P 12 is a system memory used as a memory for storing a program or data, a memory for unpacking the program or data, a memory for drawing by a printer, and the like, and is composed of the ROM 12a and the RAM 12b. The ROM 12a is a read only memory used as a memory for storing a program or data. The RAM 12b is a read-write memory used as a memory for unpacking the program or data, a memory for drawing by a printer, and the like.

The SB 14 is a bridge for connecting the NB 13 to a PCI device and a peripheral device. The SB 14 is connected to the NB 13 via the PCI bus, and, for example, a network interface (I/F) is connected to the PCI bus. A network interface (I/F) unit and the like are connected to the PCI bus.

The ASIC 16 is an image processing IC (Integrated Circuit) including hardware components for image processing. The ASIC 16 serves as a bridge for connecting the AGP bus 15, the PCI bus, the HDD 18, and the MEM-C 17. The ASIC 16 is composed of a PCI target, an AGP master, an arbiter (ARB) which is the core of the ASIC 16, a memory controller for controlling the MEM-C 17, a plurality of DMACs (Direct Memory Access Controllers) for performing rotation of image data or the like by a hardware logic, and a PCI unit for performing data transfer between the controller 10 and the engine unit 60 via the PCI bus. An FCU (Facsimile Control Unit) 30, a USB (Universal Serial Bus) 40, and an IEEE 1394 (the Institute of Electrical and Electronics Engineers 1394) interface 50 are connected to the ASIC 16 via the PCI bus. An operation display unit 20 is directly connected to the ASIC 16.

The MEM-C 17 is a local memory used as a copy image buffer and a code buffer. The HDD 18 is a storage for storing therein image data, a program, font data, and a form.

The AGP bus 15 is a bus interface for a graphic accelerator card proposed to speed up a graphics operation, and accelerates the graphic accelerator card by directly accessing the MEM-P 12 at high throughput.

According to the present invention, it is possible to achieve formation of a high-resolution image at high speed even in duplex printing without causing global image deterioration and also possible to prevent the appearance of banding.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus, comprising:
a receiving circuit that receives a designation of a sub-scanning directional shift amount of a correction pixel to be corrected;
a position determining circuit that performs a position determining process to determine a position of the correction pixel in input image data according to the shift amount of which the designation is received; and
a scaling unit circuit that scales the input image data by adding the correction pixel to or deleting the correction pixel from the determined position in the input image data, wherein
the position determining circuit calculates a value of Y in coordinate (p, Y) indicating the position of the correction pixel by equations (1) to (3) if B≥0 or equations (4) to (6) if B<0, provided that "Z" denotes an arbitrary integer, "int" denotes a symbol of operation to obtain an integral quotient, "%" denotes a symbol of operation to obtain a remainder, "S" denotes a cycle of a main-scanning process, "B" denotes the shift amount, and rate=S×B:

$$t1 = B \times \{(p+Z) \% S\} \quad (1)$$

$$t2 = \text{int}(Y/\text{rate}) \times \text{rate} \quad (2)$$

$$Y = t1 + t2 \quad (3)$$

$$t1 = \text{rate} + B \times \{(p+Z) \% S\} \quad (4)$$

$$t2 = \text{int}(Y/\text{rate}) \times \text{rate} \quad (5)$$

$$Y = t1 = t2 \quad (6).$$

2. The image forming apparatus according to claim 1, wherein the position determining circuit performs the position determining process so that a direction where a plurality of correction pixels form a line changes according to the shift amount.

3. The image forming apparatus according to claim 1, wherein
the receiving circuit receives a designation of a shift amount that cannot be divided by a scale factor and a designation of a sub-scanning directional offset value, and
the position determining circuit performs the position determining process using the shift amount that cannot be divided by the scale factor and the offset value.

4. The image forming apparatus according to claim 1, wherein the position determining circuit further calculates the value of Y in coordinate (p, Y) according to equations (5) to (7), provided that "offset" is a fixed value:

$$t2 = \text{int}(Y/\text{rate}) \times \text{rate} \quad (5)$$

$$Y = t1 + t2 \quad (6)$$

$$t1 = \text{offset} + (B \times p) \% \text{rate} \quad (7).$$

5. The image forming apparatus according to claim 1, further comprising a memory that stores therein a set-value table in which a set value of the shift amount is associated with predetermined data, wherein
the receiving circuit receives a shift amount corresponding to a value of the data from the set-value table.

6. The image forming apparatus according to claim 5, wherein the predetermined data is a dither screen angle.

7. The image forming apparatus according to claim 5, wherein
the receiving circuit receives an instruction to change the set value included in the set-value table, and stores the received instruction in the set-value table, and
the scaling circuit scales the image data based on the set-value table in which the set value is changed.

8. The image forming apparatus according to claim 1, wherein the receiving circuit receives the designation of the sub-scanning directional shift amount from a user via a user interface.

9. The image forming apparatus according to claim 1, wherein the scaling circuit scales the input image data according to a scaling factor.

10. The image forming apparatus according to claim 1, further comprising a scaling factor determining circuit that obtains a first scaling factor for the input image data to be printed on a first side of a printing sheet and determines a second scaling factor for the input image data to be printed on a second side of the printing sheet based on the first scaling factor.

11. The image forming apparatus according to claim 10, wherein
the scaling circuit scales the input image data according to the first scaling factor and the second scaling factor.

12. An image forming method, comprising:
receiving a designation of a sub-scanning directional shift amount of a correction pixel to be corrected;
performing, by circuitry, a position determining process to determine a position of the correction pixel in input image data according to the shift amount of which the designation is received; and
scaling, by the circuitry, the input image data by adding the correction pixel to or deleting the correction pixel from the determined position in the input image data, wherein
the position determining process includes calculating a value of Y in coordinate (p, Y) indicating the position of the correction pixel by equations (1) to (3) if B≥0 or equations (4) to (6) if B<0, provided that "Z" denotes an arbitrary integer, "int" denotes a symbol of operation to obtain an integral quotient, "%" denotes a symbol of operation to obtain a remainder, "S" denotes a cycle of a main-scanning process, "B" denotes the shift amount, and rate=S×B:

$$t1 = B \times \{(p+Z) \% S\} \quad (1)$$

$$t2 = \text{int}(Y/\text{rate}) \times \text{rate} \quad (2)$$

$$Y = t1 + t2 \quad (3)$$

$$t1 = \text{rate} + B \times \{(p+Z) \% S\} \quad (4)$$

$$t2 = \text{int}(Y/\text{rate}) \times \text{rate} \quad (5)$$

$$Y = t1 + t2 \quad (6).$$

13. The image forming method according to claim 12, wherein the position determining process includes calculating the position of the correction pixel so that a direction where a plurality of correction pixels form a line changes according to the shift amount.

14. The image forming method according to claim 12, wherein the position determining process includes calculating the value of Y in coordinates (p, Y) according to equations (5) to (7), provided that "offset" is a fixed value:

$$t2 = \text{int}(Y/\text{rate}) \times \text{rate} \quad (5)$$

$$Y = t1 + t2 \quad (6)$$

$$t1 = \text{offset} + (B \times p) \% \text{rate} \quad (7).$$

15. The image forming method according to claim 12, further comprising:

storing, in a memory, a set-value table in which a set value of the shift amount is associated with predetermined data; and receiving a shift amount corresponding to a value of the data from the set-value table.

16. The image forming method according to claim 12, wherein the designation of the sub-scanning directional shift amount is received from a user via a user interface.

17. An image forming apparatus, comprising:

a receiving circuit that receives a designation of a sub-scanning directional shift amount of a correction pixel to be corrected;

first means for performing a position determining process to determine a position of the correction pixel in input image data according to the shift amount of which the designation is received; and second means for scaling the input image data by adding the correction pixel to or deleting the correction pixel from the determined position in the input image data, wherein the position determining process includes calculating a value of Y in coordinate (p, Y) indicating the position of the correction pixel by equations (1) to (3) if B≥0 or equations (4) to (6) if B<0, provided that "Z" denotes an arbitrary integer, "int" denotes a symbol of operation to obtain an integral quotient, "%" denotes a symbol of operation to obtain a remainder, "S" denotes a cycle of a main-scanning process, "B" denotes the shift amount, and rate=S×B:

$$t1 = B \times \{(p+Z) \% S\} \quad (1)$$

$$t2 = \mathrm{int}(Y/\mathrm{rate}) \times \mathrm{rate} \quad (2)$$

$$Y = t1 + t2 \quad (3)$$

$$t1 = \mathrm{rate} + B \times \{(p+Z) \% S\} \quad (4)$$

$$t2 = \mathrm{int}(Y/\mathrm{rate}) \times \mathrm{rate} \quad (5)$$

$$Y = t1 + t2 \quad (6).$$

18. The image forming apparatus according to claim 17, wherein the first means performs the position determining process so that a direction where a plurality of correction pixels form a line changes according to the shift amount.

19. The image forming apparatus according to claim 17, wherein the receiving circuit receives a designation of a shift amount that cannot be divided by a scale factor and a designation of a sub-scanning directional offset value, and the first means performs the position determining process using the shift amount that cannot be divided by the scale factor and the offset value.

20. The image forming apparatus according to claim 17, wherein the first means further calculates the value of Y in coordinate (p, Y) according to equations (5) to (7), provided that "offset" is a fixed value:

$$t2 = \mathrm{int}(Y/\mathrm{rate}) \times \mathrm{rate} \quad (5)$$

$$Y = t1 + t2 \quad (6)$$

$$t1 = \mathrm{offset} + (B \times p) \% \mathrm{rate} \quad (7).$$

* * * * *